US010031318B2

(12) United States Patent
Chen et al.

(10) Patent No.: US 10,031,318 B2
(45) Date of Patent: Jul. 24, 2018

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventors: Chun-Yen Chen, Taichung (TW); Yu-Tai Tseng, Taichung (TW); Wei-Yu Chen, Taichung (TW); Chun-Che Hsueh, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/201,326

(22) Filed: Jul. 1, 2016

(65) Prior Publication Data
US 2017/0248770 A1    Aug. 31, 2017

(30) Foreign Application Priority Data

Feb. 26, 2016  (TW) .............................. 105105952 A

(51) Int. Cl.
*G02B 13/18*      (2006.01)
*G02B 9/62*       (2006.01)
(Continued)

(52) U.S. Cl.
CPC ........... *G02B 13/0045* (2013.01); *G02B 9/62* (2013.01); *G02B 3/04* (2013.01); *G02B 5/005* (2013.01);
(Continued)

(58) Field of Classification Search
CPC .. G02B 13/0045; G02B 9/62; G02B 27/0025; G02B 13/18; G02B 5/005; G02B 3/04; G02B 13/002
(Continued)

(56) References Cited

U.S. PATENT DOCUMENTS 8,432,619 B2    4/2013  Huang
2012/0243108 A1*  9/2012  Tsai .................. G02B 13/0045
                                                          359/713
(Continued)

FOREIGN PATENT DOCUMENTS

CN         105467562 A     4/2016
CN         106154495 A    11/2016
WO       2017/078255 A1    5/2017

*Primary Examiner* — Evelyn A Lester
(74) *Attorney, Agent, or Firm* — Maschoff Brennan

(57) ABSTRACT

An optical imaging lens assembly includes, in order from an object side to an image side, a first lens element, a second lens element, a third lens element, a fourth lens element, a fifth lens element and a sixth lens element. The first lens element with positive refractive power has an object-side surface being convex. The second lens element has negative refractive power. At least one of two surfaces of the fourth lens element has at least one inflection point, and the two surfaces thereof are aspheric. The fifth lens element has an object-side surface being convex and an image-side surface having at least one inflection point, and the two surfaces thereof are aspheric. The sixth lens element has an image-side surface being concave, wherein the image-side surface of the sixth lens element has at least one convex shape in off-axial region, and the two surfaces thereof are aspheric.

25 Claims, 19 Drawing Sheets

(51) Int. Cl.
   *G02B 13/00* (2006.01)
   *G02B 3/04* (2006.01)
   *G02B 27/00* (2006.01)
   *G02B 5/00* (2006.01)

(52) U.S. Cl.
   CPC ............ *G02B 13/002* (2013.01); *G02B 13/18* (2013.01); *G02B 27/0025* (2013.01)

(58) Field of Classification Search
   USPC .................................. 359/713, 740, 756, 757
   See application file for complete search history.

(56) References Cited

U.S. PATENT DOCUMENTS

| | | | |
|---|---|---|---|
| 2013/0003193 A1* | 1/2013 | Huang | G02B 13/0045 359/713 |
| 2013/0033762 A1* | 2/2013 | Tsai | G02B 13/0045 359/713 |
| 2014/0185150 A1* | 7/2014 | Shinohara | G02B 13/0045 359/713 |
| 2015/0146092 A1 | 5/2015 | Chen | |
| 2015/0168686 A1* | 6/2015 | Nishihata | G02B 13/04 359/757 |
| 2015/0253546 A1* | 9/2015 | Sun | G02B 13/0045 359/713 |
| 2015/0260961 A1* | 9/2015 | Ota | G02B 13/0045 359/713 |
| 2015/0338607 A1 | 11/2015 | Liao et al. | |
| 2015/0370038 A1* | 12/2015 | Sun | G02B 9/62 359/757 |
| 2015/0370042 A1 | 12/2015 | Chen et al. | |
| 2016/0004039 A1* | 1/2016 | Chen | G02B 13/0045 359/713 |
| 2016/0004040 A1* | 1/2016 | Chen | G02B 13/0045 359/713 |
| 2016/0004048 A1* | 1/2016 | Noda | G02B 9/62 359/713 |
| 2016/0116715 A1* | 4/2016 | Ota | G02B 13/0045 359/757 |
| 2016/0187620 A1* | 6/2016 | Huang | G02B 13/0045 359/713 |
| 2016/0306145 A1* | 10/2016 | Tang | G02B 13/0045 |
| 2016/0356989 A1 | 12/2016 | Kubota et al. | |
| 2017/0090162 A1* | 3/2017 | Chen | G02B 13/0045 |
| 2017/0146776 A1 | 5/2017 | Kang et al. | |

* cited by examiner

OPTICAL IMAGING LENS ASSEMBLY, IMAGE CAPTURING UNIT AND ELECTRONIC DEVICE

RELATED APPLICATIONS

This application claims priority to Taiwan Application 105105952, filed Feb. 26, 2016, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

The optical systems have been widely applied to different kinds of electronic devices, such as smartphones, wearable devices and tablet personal computers, for various requirements. However, the conventional compact optical system is unable to satisfy the requirements of large aperture stop and compact size simultaneously. Moreover, the lens elements in the conventional compact optical system are arranged with an overly short axial distance between every two of the lens elements adjacent to each other, and this arrangement causes difficulties in the process for assembling the lens elements. Thus, there is a need to develop an optical system featuring a large aperture stop, compact size and simpler assembling process.

SUMMARY

According to one aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has negative refractive power. At least one of an object-side surface and an image-side surface of the fourth lens element has at least one inflection point, and the object-side surface and the image-side surface of the fourth lens element are both aspheric. The fifth lens element has an object-side surface being convex in a paraxial region thereof, wherein an image-side surface of the fifth lens element has at least one inflection point, and the object-side surface and the image-side surface of the fifth lens element are both aspheric. The sixth lens element has an image-side surface being concave in a paraxial region thereof, wherein the image-side surface of the sixth lens element has at least one convex shape in an off-axial region thereof, and an object-side surface and the image-side surface of the sixth lens element are both aspheric. The optical imaging lens assembly has a total of six lens elements, There is an air gap in a paraxial region between every two lens elements of the optical imaging lens assembly that are adjacent to each other. When a focal length of the optical imaging lens assembly is f, a central thickness of the fourth lens element is CT4, a curvature radius of the image-side surface of the fourth lens element is R8, a curvature radius of the image-side surface of the fifth lens element is R10, an axial distance between the second lens element and the third lens element is T23, an axial distance between the third lens element and the fourth lens element is T34, an axial distance between the fourth lens element and the fifth lens element is T45, the following conditions are satisfied:

$$0 \leq f/R8;$$

$$0 \leq f/R10;$$

$$0 < (CT4/T34)+(CT4/T45) < 5.0; \text{ and}$$

$$0.90 < T45/T23.$$

According to another aspect of the present disclosure, an image capturing unit includes the aforementioned optical imaging lens assembly and an image sensor, wherein the image sensor is disposed on an image surface of the optical imaging lens assembly.

According to still another aspect of the present disclosure, an electronic device includes the aforementioned image capturing unit.

According to yet still another aspect of the present disclosure, an optical imaging lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element with negative refractive power has an image-side surface being concave in a paraxial region thereof. At least one of an object-side surface and an image-side surface of the fourth lens element has at least one inflection point, and the object-side surface and the image-side surface of the fourth lens element are both aspheric. An image-side surface of the fifth lens element has at least one inflection point, and an object-side surface and the image-side surface of the fifth lens element are both aspheric. The sixth lens element has an image-side surface being concave in a paraxial region thereof, wherein the image-side surface of the sixth lens element has at least one convex shape in an off-axial region thereof, and an object-side surface and the image-side surface of the sixth lens element are both aspheric. The optical imaging lens assembly has a total of six lens elements. There is an air gap in a paraxial region between every two lens elements of the optical imaging lens assembly that are adjacent to each other. When a focal length of the optical imaging lens assembly is f, a central thickness of the fourth lens element is CT4, a curvature radius of an object-side surface of the second lens element is R3, a curvature radius of the image-side surface of the second lens element is R4, a curvature radius of the image-side surface of the fourth lens element is R8, a curvature radius of the image-side surface of the fifth lens element is R10, an axial distance between the second lens element and the third lens element is T23, an axial distance between the third lens element and the fourth lens element is T34, an axial distance between the fourth lens element and the fifth lens element is T45, the following conditions are satisfied:

$$0 \leq f/R8;$$

$$0 \leq f/R10;$$

$$0 < (CT4/T34)+(CT4/T45) < 5.0;$$

$$0.90 < T45/T23; \text{ and}$$

$$0 < (R3+R4)/(R3-R4).$$

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
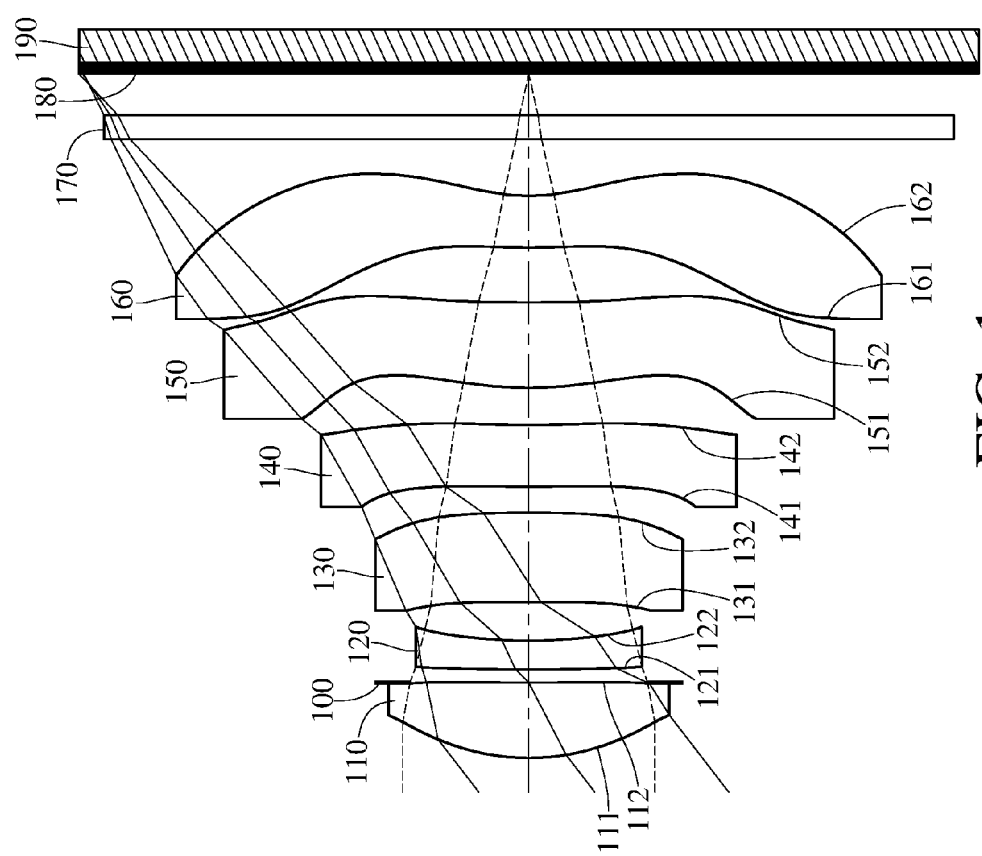
FIG. 1 is a schematic view of an image capturing unit according to the 1st embodiment of the present disclosure.

An optical imaging lens assembly includes, in order from an object side to an image side, a first lens element, a second lens element, a third lens element, a fourth lens element, a fifth lens element and a sixth lens element. The optical imaging lens assembly has a total of six lens elements.

There is an air gap in a paraxial region between every two lens elements of the optical imaging lens assembly that are adjacent to each other; that is, each of the first through the sixth lens elements can be a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality. Therefore, there can be an air gap in a paraxial region between every two lens elements of the optical imaging lens assembly that are adjacent to each other in the present disclosure for solving the problem generated by the cemented lens elements.

The first lens element with positive refractive power has an object-side surface being convex in a paraxial region thereof. Therefore, it is favorable for providing the positive refractive power needed for the optical imaging lens assembly and reducing a total track length thereof.

The second lens element with negative refractive power can have an object-side surface being convex and an image-side surface being concave in a paraxial region thereof. Therefore, it is favorable for correcting aberrations generated by the first lens element.

The third lens element can have positive refractive power. Therefore, it is favorable for preventing the refractive power of the first lens element from being overly large so as to reduce the sensitivity of the optical imaging lens assembly.

The fourth lens element can have an image-side surface being concave in a paraxial region thereof, wherein at least one of an object-side surface and the image-side surface of the fourth lens element has at least one inflection point. Therefore, it is favorable for reducing a back focal length of the optical imaging lens assembly and providing a flatter lens shape for a desirable assembling process.

The fifth lens element can have positive refractive power. The fifth lens element can have an object-side surface being convex in a paraxial region thereof and an image-side surface being concave in a paraxial region thereof, wherein the image-side surface of the fifth lens element has at least one inflection point. Therefore, it is favorable for reducing the incident angle of the light projecting onto an image sensor so as to improve the image-sensing, thereby correcting aberrations at the off-axial field. Furthermore, each of the image-side surfaces of the fourth and fifth lens elements has at least one inflection point, and it is favorable for lens manufacturing and assembling processes.

The sixth lens element can have negative refractive power and can have an object-side surface being convex in a paraxial region thereof. The sixth lens element has an image-side surface being concave in a paraxial region thereof and at least one convex shape in an off-axial region thereof. Therefore, it is favorable for moving the principal point of the optical imaging lens assembly away from the image side so as to reduce the total track length for a compact size setup.

When a focal length of the optical imaging lens assembly is f, a curvature radius of the image-side surface of the fourth lens element is R8, a curvature radius of the image-side surface of the fifth lens element is R10, the following conditions are satisfied: $0 \leq f/R8$; and $0 \leq f/R10$. Therefore, the image-side surfaces of the fourth lens element, the fifth lens element and the sixth lens element are favorable for reducing the back focal length so as to keep the optical imaging lens assembly compact.

When a central thickness of the fourth lens element is CT4, an axial distance between the third lens element and the fourth lens element is T34, an axial distance between the fourth lens element and the fifth lens element is T45, the following condition is satisfied: $0 < (CT4/T34) + (CT4/T45) < 5.0$. Therefore, it is favorable for properly arranging the axial distances between every two of the third through sixth lens elements that are adjacent to each other while providing a short track length, thereby obtaining an easier assembling process. Preferably, the following condition can also be satisfied: 0.75<(CT4/T34)+(CT4/T45)<4.30.

When an axial distance between the second lens element and the third lens element is T23, the axial distance between the fourth lens element and the fifth lens element is T45, the following condition is satisfied: 0.90<T45/T23. Therefore, it is favorable for arranging a sufficient axial distance between the second lens element and the third lens element so as to prevent assembling problems. Preferably, the following condition can also be satisfied: 0.95<T45/T23.

When a curvature radius of the object-side surface of the second lens element is R3, a curvature radius of the image-side surface of the second lens element is R4, the following condition can be satisfied: 0<(R3+R4)/(R3−R4). Therefore, it is favorable for properly arranging the shape of the second lens element so as to correct aberrations.

When the axial distance between the second lens element and the third lens element is T23, the axial distance between the third lens element and the fourth lens element is T34, the axial distance between the fourth lens element and the fifth lens element is T45, the following condition can be satisfied: 1.80<(T45/T23)+(T45/T34). Therefore, it is favorable for providing sufficient space in the middle section of the optical imaging lens assembly so as to prevent interference among the lens elements in the assembling process.

When the focal length of the optical imaging lens assembly is f, a focal length of the fifth lens element is f5, a focal length of the sixth lens element is f6, the following condition can be satisfied: 1.0<|f/f5|+|f/f6|<2.5. Therefore, it is favorable for allocating the fifth and sixth lens elements with strong refractive power so as to improve the capability for correcting aberrations. Furthermore, it is favorable for preventing the fifth and sixth lens elements from being overly curved so as to reduce molding problems. Preferably, the following condition can also be satisfied: 1.0<|f/f5|+|f/f6|<2.0.

When an axial distance between the object-side surface of the first lens element and an image surface is TL, a maximum image height of the optical imaging lens assembly (half of a diagonal length of an effective photosensitive area of the image sensor) is ImgH, the following condition can be satisfied: TL/ImgH<1.60. Therefore, it is favorable for miniaturizing the optical imaging lens assembly so as to be equipped in a compact electronic device.

When the focal length of the optical imaging lens assembly is f, a focal length of the third lens element is f3, a focal length of the fourth lens element is f4, the following condition can be satisfied: |f/f3|+|f/f4|<0.75. Therefore, it is favorable for arranging the refractive power of the third and fourth lens elements so as to prevent overcorrecting aberrations at the off-axial region, thereby improving the image quality. Furthermore, it is favorable for reducing the surface shape variations of the third lens element and the fourth lens element so as to reduce ghosting.

When a focal length of the second lens element is f2, the focal length of the sixth lens element is f6, the following condition can be satisfied: |f6/f2|<1.0. Therefore, the refractive power distribution of the second lens element and the sixth lens element is favorable for reducing the sensitivity of the optical imaging lens assembly to increase the manufacturing yield rate while keeping the optical imaging lens assembly compact.

When a central thickness of the sixth lens element is CT6, the axial distance between the fourth lens element and the fifth lens element is T45, the following condition can be satisfied: CT6/T45<1.70. Therefore, it is favorable for reducing space required for allocating the lens elements at the image side of the optical imaging lens assembly so as to provide a compact lens configuration.

When the focal length of the optical imaging lens assembly is f, the curvature radius of the image-side surface of the fourth lens element is R8, the curvature radius of the image-side surface of the fifth lens element is R10, a curvature radius of the image-side surface of the sixth lens element is R12, the following condition can be satisfied: 1.5<|R8/f|+|R10/f|+|R12/f|<5.0. Therefore, it is favorable for avoiding image-side surfaces of the fourth through the sixth lens elements from being overly flat so as to provide sufficient aberration corrections.

According to the present disclosure, the lens elements of the optical imaging lens assembly can be made of glass or plastic material. When the lens elements are made of glass material, the refractive power distribution of the optical imaging lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the optical imaging lens assembly can also be reduced.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the optical imaging lens assembly on the corresponding image sensor can be flat or curved, particularly a concave curved surface facing towards the object side of the optical imaging lens assembly.

According to the present disclosure, the optical imaging lens assembly can include at least one stop, such as an aperture stop, a glare stop or a field stop. Said glare stop or said field stop is allocated for eliminating the stray light and thereby improving the image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, an image capturing unit includes the aforementioned optical imaging lens assembly and an image sensor, wherein the image sensor is disposed on the image side and can be located on or near an image surface of the aforementioned optical imaging lens assembly. In some embodiments, the image capturing unit can further include a barrel member, a holding member or a combination thereof.

Figure 17:
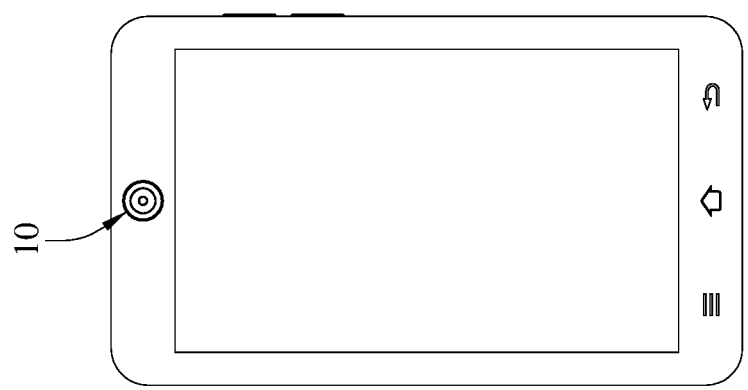
FIG. 17 shows an electronic device according to one embodiment.
Figure 18:
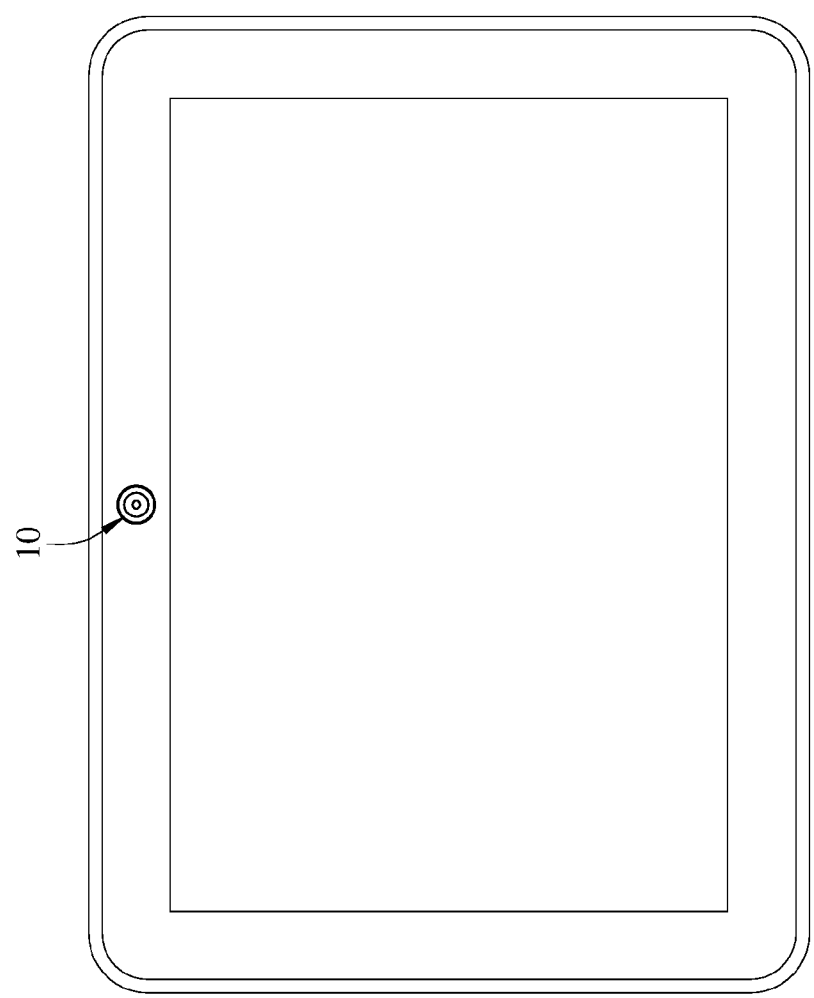
FIG. 18 shows an electronic device according to another embodiment.
Figure 19:
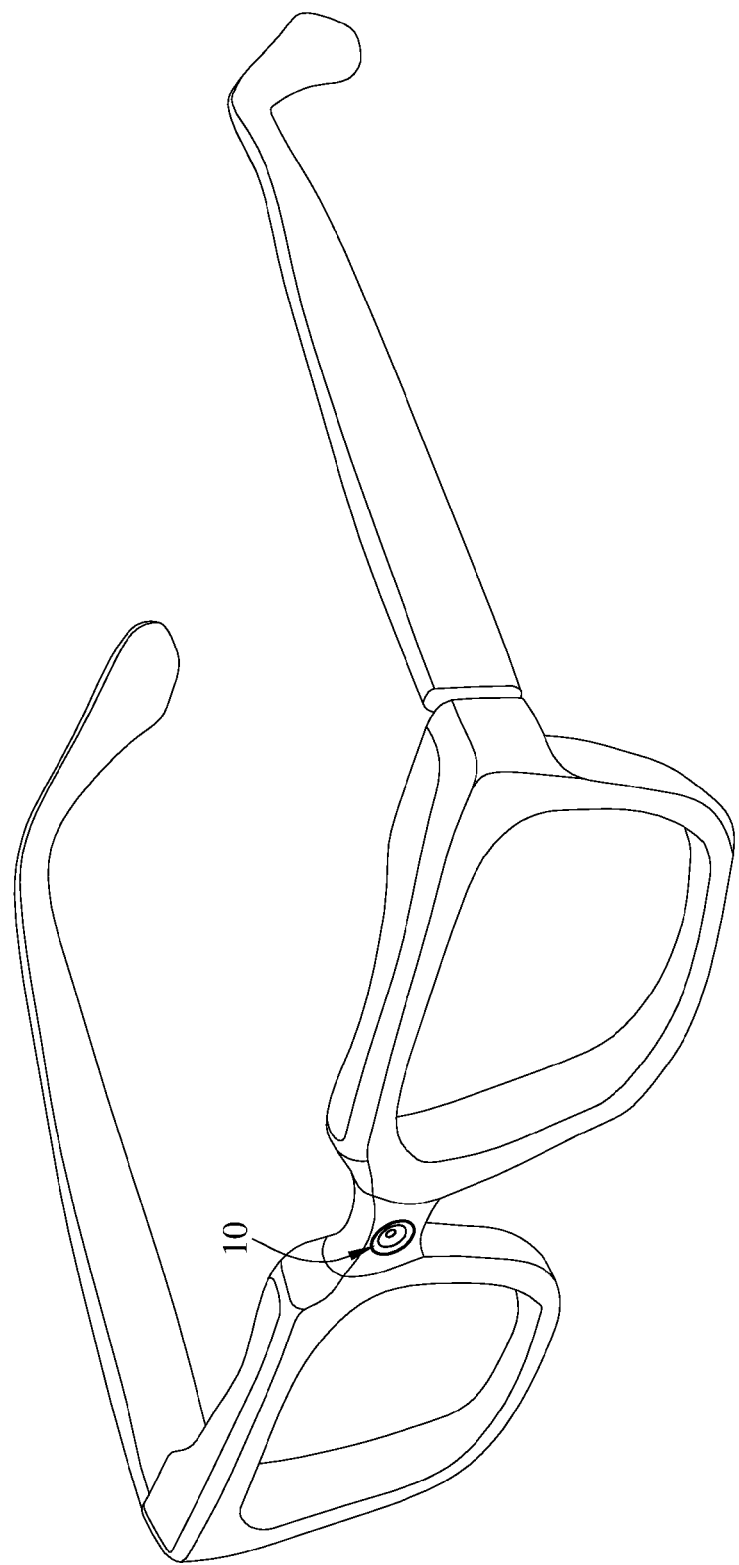
FIG. 19 shows an electronic device according to still another embodiment.

In FIG. 17, FIG. 18 and FIG. 19, an image capturing unit 10 may be installed in, but not limited to, an electronic device, including a smartphone (FIG. 17), a tablet personal computer (FIG. 18) or a wearable device (FIG. 19). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the optical imaging lens assembly can be optionally applied to optical systems with a movable focus. Furthermore, the optical imaging lens assembly is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
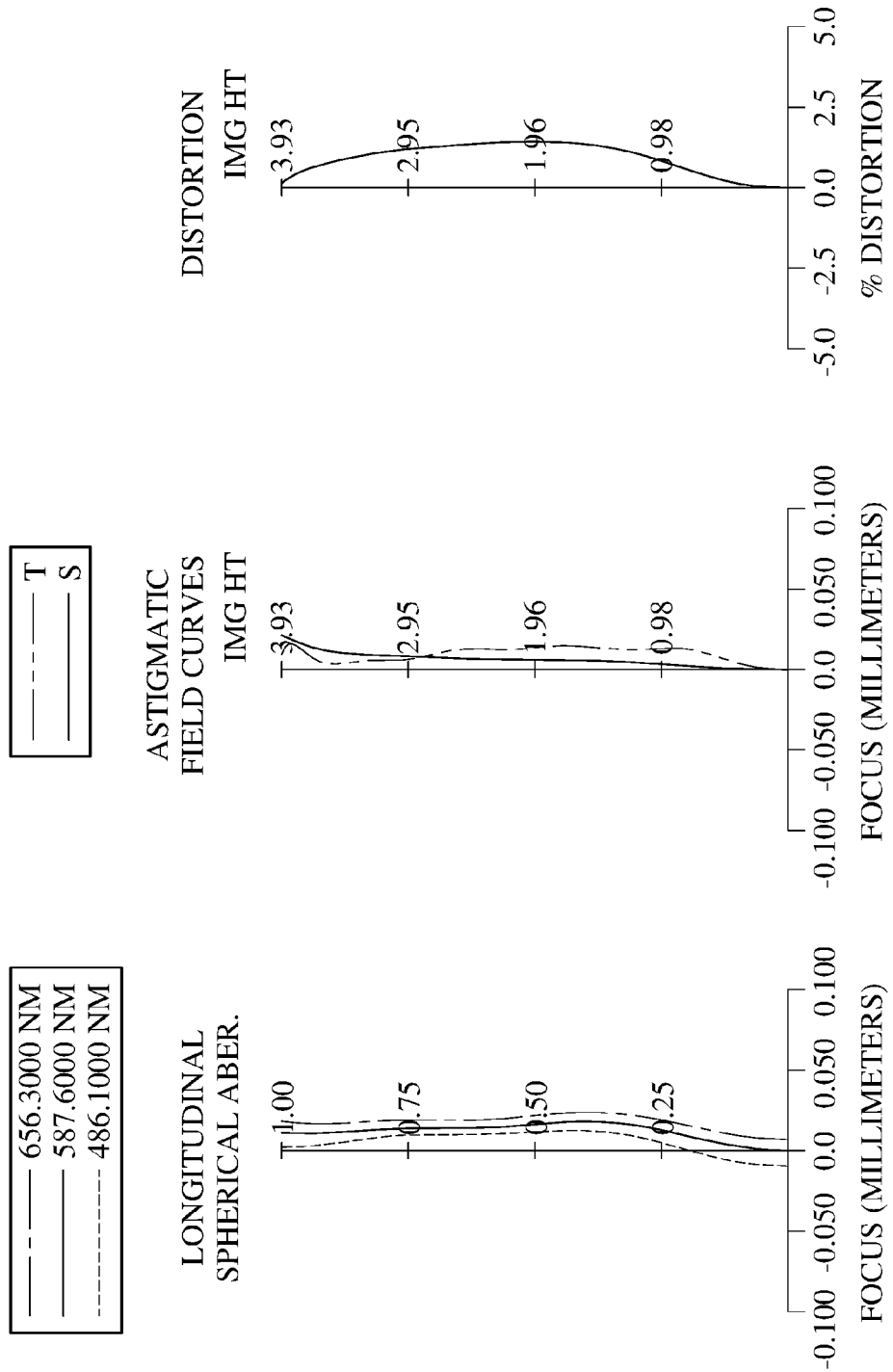
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 190. The optical imaging lens assembly includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image surface 180, wherein the optical imaging lens assembly has a total of six lens elements (110-160). There is an air gap in a paraxial region between every two lens elements of the optical imaging lens assembly that are adjacent to each other.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. Each of the object-side surface 141 and the image-side surface 142 of the fourth lens element 140 has at least one inflection point.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one inflection point.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one convex shape in an off-axial region thereof.

The IR-cut filter 170 is made of glass material and located between the sixth lens element 160 and the image surface 180, and will not affect the focal length of the optical imaging lens assembly. The image sensor 190 is disposed on or near the image surface 180 of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens assembly of the image capturing unit according to the 1st embodiment, when a focal length of the optical imaging lens assembly is f, an f-number of the optical imaging lens assembly is Fno, and half of a maximal field of view of the optical imaging lens assembly is HFOV, these parameters have the following values: f=5.06 millimeters (mm); Fno=2.28; and HFOV=37.7 degrees (deg.).

When a curvature radius of the object-side surface 121 of the second lens element 120 is R3, a curvature radius of the image-side surface 122 of the second lens element 120 is R4, the following condition is satisfied: (R3+R4)/(R3−R4)= 1.94.

When the focal length of the optical imaging lens assembly is f, a curvature radius of the image-side surface 142 of the fourth lens element 140 is R8, a curvature radius of the image-side surface 152 of the fifth lens element 150 is R10, a curvature radius of the image-side surface 162 of the sixth lens element 160 is R12, the following condition is satisfied: |R8/f|+|R10/f|+|R12/f|=6.86.

When a central thickness of the fourth lens element 140 is CT4, an axial distance between the third lens element 130 and the fourth lens element 140 is T34, an axial distance between the fourth lens element 140 and the fifth lens element 150 is T45, the following condition is satisfied: (CT4/T34)+(CT4/T45)=4.01.

When a central thickness of the sixth lens element 160 is CT6, the axial distance between the fourth lens element 140 and the fifth lens element 150 is T45, the following condition is satisfied: CT6/T45=1.39.

When an axial distance between the second lens element 120 and the third lens element 130 is T23, the axial distance between the third lens element 130 and the fourth lens element 140 is T34, the axial distance between the fourth lens element 140 and the fifth lens element 150 is T45, the following condition is satisfied: (T45/T23)+(T45/T34)=2.40.

When the axial distance between the second lens element 120 and the third lens element 130 is T23, the axial distance between the fourth lens element 140 and the fifth lens element 150 is T45, the following condition is satisfied: T45/T23=0.96.

When an axial distance between the object-side surface 111 of the first lens element 110 and the image surface 180 is TL, a maximum image height of the optical imaging lens assembly is ImgH, the following condition is satisfied: TL/ImgH=1.53.

When the focal length of the optical imaging lens assembly is f, a focal length of the third lens element 130 is f3, a focal length of the fourth lens element 140 is f4, the following condition is satisfied: |f/f3|+|f/f4|=0.34.

When the focal length of the optical imaging lens assembly is f, a focal length of the fifth lens element 150 is f5, a focal length of the sixth lens element 160 is f6, the following condition is satisfied: |f/f5|+|f/f6|=1.86.

When a focal length of the second lens element 120 is f2, the focal length of the sixth lens element 160 is f6, the following condition is satisfied: |f6/f2|=0.48.

When the focal length of the optical imaging lens assembly is f, the curvature radius of the image-side surface 142 of the fourth lens element 140 is R8, the following condition is satisfied: f/R8=0.73.

When the focal length of the optical imaging lens assembly is f, the curvature radius of the image-side surface 152 of the fifth lens element 150 is R10, the following condition is satisfied: f/R10=0.19.

The detailed optical data of the 1st embodiment are shown in Table 1 and the aspheric surface data are shown in Table 2 below.

TABLE 1

1st Embodiment
f = 5.06 mm, Fno = 2.28, HFOV = 37.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.020 (ASP) | 0.663 | Plastic | 1.545 | 56.1 | 4.02 |
| 2 | | 22.678 (ASP) | 0.000 | | | | |
| 3 | Ape. Stop | Plano | 0.116 | | | | |
| 4 | Lens 2 | 13.094 (ASP) | 0.254 | Plastic | 1.660 | 20.4 | −9.46 |
| 5 | | 4.195 (ASP) | 0.341 | | | | |
| 6 | Lens 3 | −273.086 (ASP) | 0.785 | Plastic | 1.545 | 56.1 | 39.41 |
| 7 | | −19.931 (ASP) | 0.230 | | | | |
| 8 | Lens 4 | 13.808 (ASP) | 0.543 | Plastic | 1.583 | 30.2 | −24.29 |
| 9 | | 6.892 (ASP) | 0.329 | | | | |
| 10 | Lens 5 | 3.307 (ASP) | 0.752 | Plastic | 1.545 | 56.1 | 6.87 |
| 11 | | 26.202 (ASP) | 0.483 | | | | |
| 12 | Lens 6 | 5.618 (ASP) | 0.456 | Plastic | 1.515 | 56.5 | −4.52 |
| 13 | | 1.599 (ASP) | 0.500 | | | | |
| 14 | IR-cut filter | Plano | 0.210 | Glass | 1.517 | 64.2 | — |
| 15 | | Plano | 0.366 | | | | |
| 16 | Image | Plano | — | | | | |

Note:
Reference wavelength is 587.6 nm (d-line).
Effective radius of the object-side surface 151 (Surface 10) is 2.000 mm.

TABLE 2

Aspheric Coefficients

| | Surface # | | | | | |
|---|---|---|---|---|---|---|
| | 1 | 2 | 4 | 5 | 6 | 7 |
| k = | 3.8402E−01 | −5.4457E+01 | −8.8110E+01 | −5.8867E+01 | −9.0000E+01 | −2.7917E+01 |
| A4 = | −9.6480E−03 | −4.8961E−02 | −8.8145E−02 | 2.8348E−02 | −6.2133E−02 | −6.6428E−02 |
| A6 = | 2.7216E−03 | 5.5704E−02 | 1.6376E−01 | −7.7801E−03 | 2.1460E−02 | 2.0591E−02 |
| A8 = | −9.4103E−03 | −2.8687E−02 | −1.4101E−01 | 6.3072E−02 | −5.3084E−02 | −1.7208E−02 |
| A10 = | 8.3003E−04 | −2.3022E−02 | 6.8853E−02 | −8.8767E−02 | 6.7226E−02 | −6.5788E−03 |
| A12 = | 2.5702E−03 | 3.0643E−02 | −6.6365E−03 | 6.5007E−02 | −4.9817E−02 | 1.6887E−02 |
| A14 = | −2.3252E−03 | −1.0832E−02 | −4.4649E−03 | −1.5253E−02 | 1.9281E−02 | −8.9705E−03 |
| A16 = | — | — | — | — | — | 1.7443E−03 |

TABLE 2-continued

Aspheric Coefficients

| Surface # | | | | | |
|---|---|---|---|---|---|
| 8 | 9 | 10 | 11 | 12 | 13 |
| k = 2.4969E+01 | 1.4162E+00 | −1.3646E+01 | 7.8255E+01 | 9.2422E−01 | −6.1373E+00 |
| A4 = −8.4379E−02 | −1.0525E−01 | 1.5337E−03 | 4.7175E−02 | −1.8348E−01 | −8.9385E−02 |
| A6 = 6.3894E−02 | 5.5216E−02 | −3.7896E−02 | −3.9651E−02 | 7.8443E−02 | 3.4708E−02 |
| A8 = −4.3600E−02 | −1.0736E−02 | 2.2466E−02 | 1.4317E−02 | −2.3055E−02 | −9.8587E−03 |
| A10 = 1.0566E−02 | −7.4316E−03 | −9.9302E−03 | −3.5960E−03 | 4.6310E−03 | 1.7775E−03 |
| A12 = 1.3831E−03 | 5.8917E−03 | 2.5767E−03 | 5.7999E−04 | −5.6546E−04 | −1.8981E−04 |
| A14 = −9.1877E−04 | −1.5999E−03 | −3.6527E−04 | −5.0047E−05 | 3.7199E−05 | 1.0874E−05 |
| A16 = — | 1.5782E−04 | 2.4668E−05 | 1.7196E−06 | −1.0120E−06 | −2.5772E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the terms in the tables are the same as Table 1 and Table 2 of the 1st embodiment. Therefore, an explanation in this regard will not be provided again.

2nd Embodiment

Figure 3:
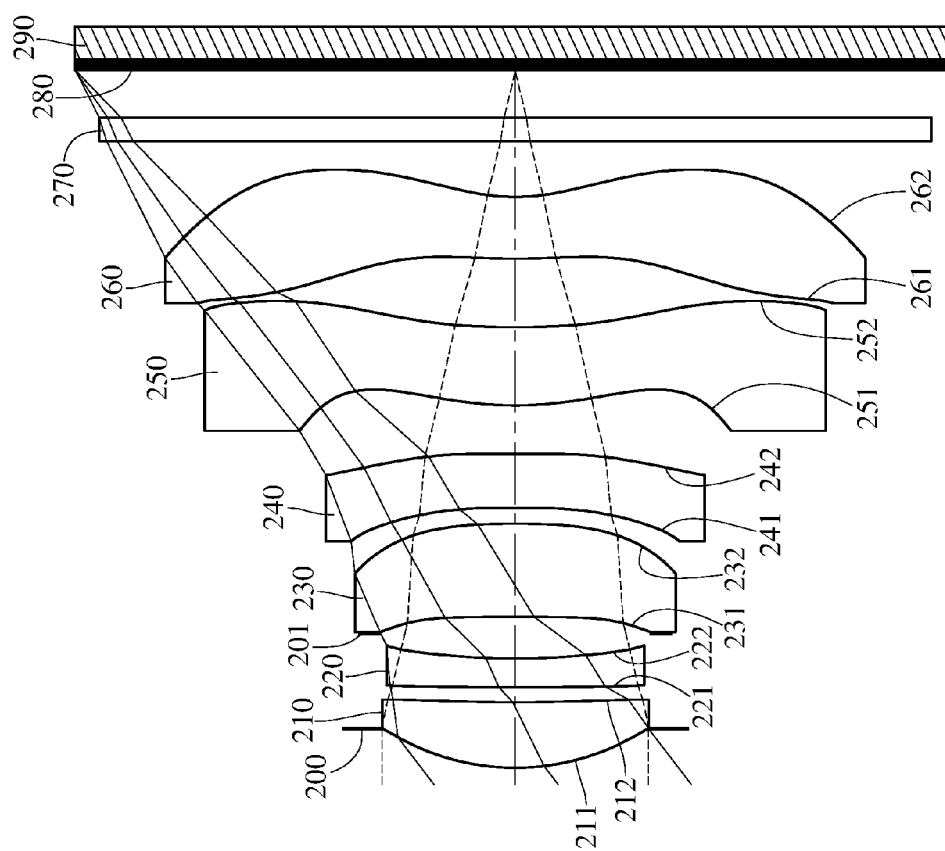
FIG. 3 is a schematic view of an image capturing unit according to the 2nd embodiment of the present disclosure.
Figure 4:
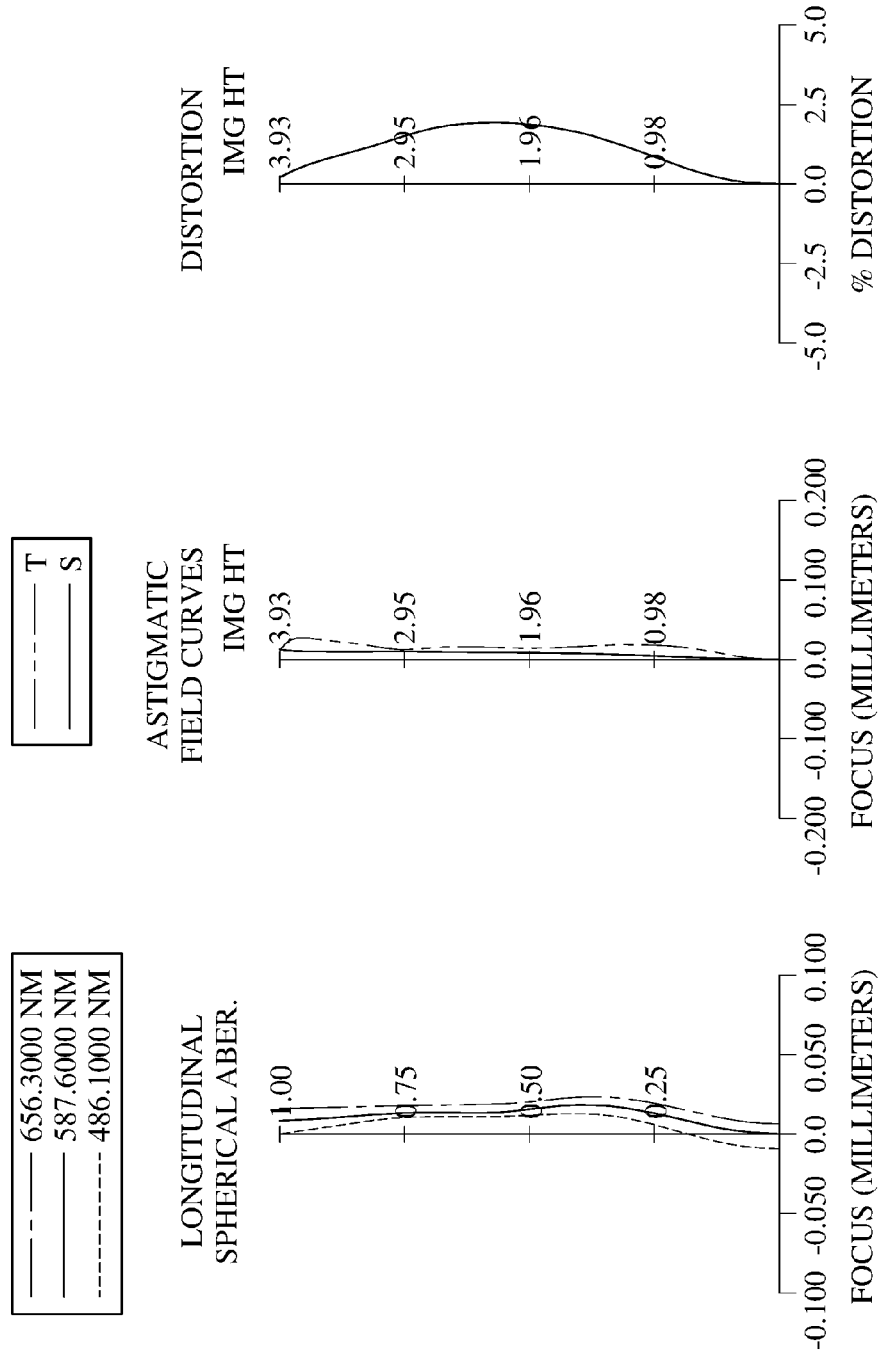
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 290. The optical imaging lens assembly includes, in order from an object side to an image side, an aperture stop 200, a first lens element 210, a second lens element 220, a stop 201, a third lens element 230, a fourth lens element 240, a fifth lens element 250, a sixth lens element 260, an IR-cut filter 270 and an image surface 280, wherein the optical imaging lens assembly has a total of six lens elements (210-260). There is an air gap in a paraxial region between every two lens elements of the optical imaging lens assembly that are adjacent to each other. The stop 201 can be a field stop or a glare stop.

The first lens element 210 with positive refractive power has an object-side surface being 211 convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being planar in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric. The image-side surface 242 of the fourth lens element 240 has at least one inflection point.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one inflection point.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one convex shape in an off-axial region thereof.

The IR-cut filter 270 is made of glass material and located between the sixth lens element 260 and the image surface 280, and will not affect the focal length of the optical imaging lens assembly. The image sensor 290 is disposed on or near the image surface 280 of the optical imaging lens assembly.

The detailed optical data of the 2nd embodiment are shown in Table 3 and the aspheric surface data are shown in Table 4 below.

TABLE 3

2nd Embodiment
f = 5.11 mm, Fno = 2.15, HFOV = 37.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.350 | | | | |
| 2 | Lens 1 | 2.153 | (ASP) | 0.584 | Plastic | 1.544 | 55.9 | 4.63 |
| 3 | | 13.454 | (ASP) | 0.133 | | | | |

TABLE 3-continued

2nd Embodiment
f = 5.11 mm, Fno = 2.15, HFOV = 37.4 deg.

| Surface # | | Curvature Radius | | Thickness | Material | Index | Abbe # | Focal Length |
|---|---|---|---|---|---|---|---|---|
| 4 | Lens 2 | 15.630 | (ASP) | 0.257 | Plastic | 1.660 | 20.4 | −12.09 |
| 5 | | 5.247 | (ASP) | 0.223 | | | | |
| 6 | Stop | Plano | | 0.150 | | | | |
| 7 | Lens 3 | ∞ | (ASP) | 0.832 | Plastic | 1.544 | 55.9 | 15.75 |
| 8 | | −8.564 | (ASP) | 0.142 | | | | |
| 9 | Lens 4 | −16.608 | (ASP) | 0.482 | Plastic | 1.639 | 23.5 | −20.59 |
| 10 | | 63.912 | (ASP) | 0.432 | | | | |
| 11 | Lens 5 | 3.111 | (ASP) | 0.699 | Plastic | 1.544 | 55.9 | 8.30 |
| 12 | | 9.214 | (ASP) | 0.611 | | | | |
| 13 | Lens 6 | 5.640 | (ASP) | 0.551 | Plastic | 1.515 | 56.5 | −4.84 |
| 14 | | 1.670 | (ASP) | 0.500 | | | | |
| 15 | IR-cut filter | Plano | | 0.210 | Glass | 1.517 | 64.2 | — |
| 16 | | Plano | | 0.421 | | | | |
| 17 | Image | Plano | | — | | | | |

Note:
Reference wavelength is 587.6 nm (d-line).
Effective radius of the stop 201 (Surface 6) is 1.200 mm.

TABLE 4

Aspheric Coefficients

| | Surface # | | | | | |
|---|---|---|---|---|---|---|
| | 2 | 3 | 4 | 5 | 7 | 8 |
| k = | 3.4257E−01 | 7.7964E+01 | −9.0000E+01 | −8.9350E+01 | 0.0000E+00 | 2.5378E+01 |
| A4 = | −4.5850E−03 | −2.7479E−02 | −5.6441E−02 | 2.5843E−02 | −5.2754E−02 | −1.0071E−01 |
| A6 = | 6.5990E−03 | 1.6212E−02 | 5.4052E−02 | −6.4085E−02 | −5.8743E−05 | 4.7918E−02 |
| A8 = | −1.4134E−02 | −3.8659E−03 | −1.2757E−02 | 1.2220E−01 | −3.4193E−02 | −2.1664E−02 |
| A10 = | 1.1110E−02 | −8.6678E−03 | −1.5194E−02 | −1.1832E−01 | 4.1863E−02 | −5.2037E−03 |
| A12 = | −3.4100E−03 | 8.3662E−03 | 1.8821E−02 | 6.1407E−02 | −3.0101E−02 | 8.9216E−03 |
| A14 = | −4.8699E−04 | −3.2869E−03 | −5.9310E−03 | −1.0926E−02 | 1.0311E−02 | −3.0744E−03 |
| A16 = | — | — | — | — | — | 3.1345E−04 |

| | Surface # | | | | | |
|---|---|---|---|---|---|---|
| | 9 | 10 | 11 | 12 | 13 | 14 |
| k = | 1.3778E+01 | −1.4264E+00 | −1.4471E+01 | −7.3793E+01 | −1.6851E+00 | −5.5848E+00 |
| A4 = | −1.3965E−01 | −1.1914E−01 | 2.2192E−02 | 6.5315E−02 | −1.3605E−01 | −6.5013E−02 |
| A6 = | 1.0816E−01 | 7.4346E−02 | −4.6873E−02 | −3.6874E−02 | 4.9379E−02 | 2.1144E−02 |
| A8 = | −4.2285E−02 | −2.2474E−02 | 2.9017E−02 | 9.6453E−03 | −1.0334E−02 | −5.0958E−03 |
| A10 = | 1.2599E−03 | 1.7221E−03 | −1.5631E−02 | −1.4718E−03 | 1.4732E−03 | 8.0564E−04 |
| A12 = | 4.6132E−03 | 1.4359E−03 | 5.4362E−03 | 1.3059E−04 | −1.4382E−04 | −8.2387E−05 |
| A14 = | −1.2904E−03 | −6.3155E−04 | −1.0725E−03 | −5.8567E−06 | 8.6589E−06 | 4.9024E−06 |
| A16 = | — | 8.9175E−05 | 8.9285E−05 | 8.1105E−08 | −2.4157E−07 | −1.2637E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.11 | T45/T23 | 1.16 |
| Fno | 2.15 | TL/ImgH | 1.59 |
| HFOV [deg.] | 37.4 | $|f/f3| + |f/f4|$ | 0.57 |
| (R3 + R4)/(R3 − R4) | 2.01 | $|f/f5| + |f/f6|$ | 1.67 |
| $|R8/f| + |R10/f| + |R12/f|$ | 14.64 | $|f6/f2|$ | 0.40 |

-continued

| 2nd Embodiment | | | |
|---|---|---|---|
| (CT4/T34) + (CT4/T45) | 4.51 | f/R8 | 0.08 |
| CT6/T45 | 1.28 | f/R10 | 0.55 |
| (T45/T23) + (T45/T34) | 4.20 | — | — |

3rd Embodiment

Figure 5:
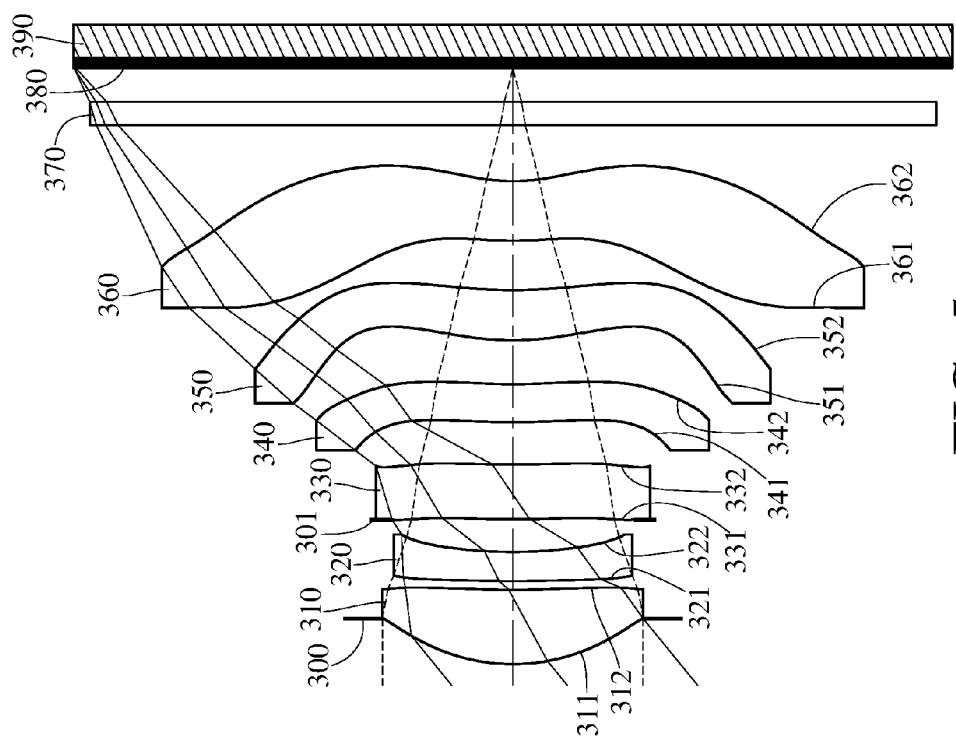
FIG. 5 is a schematic view of an image capturing unit according to the 3rd embodiment of the present disclosure.
Figure 6:
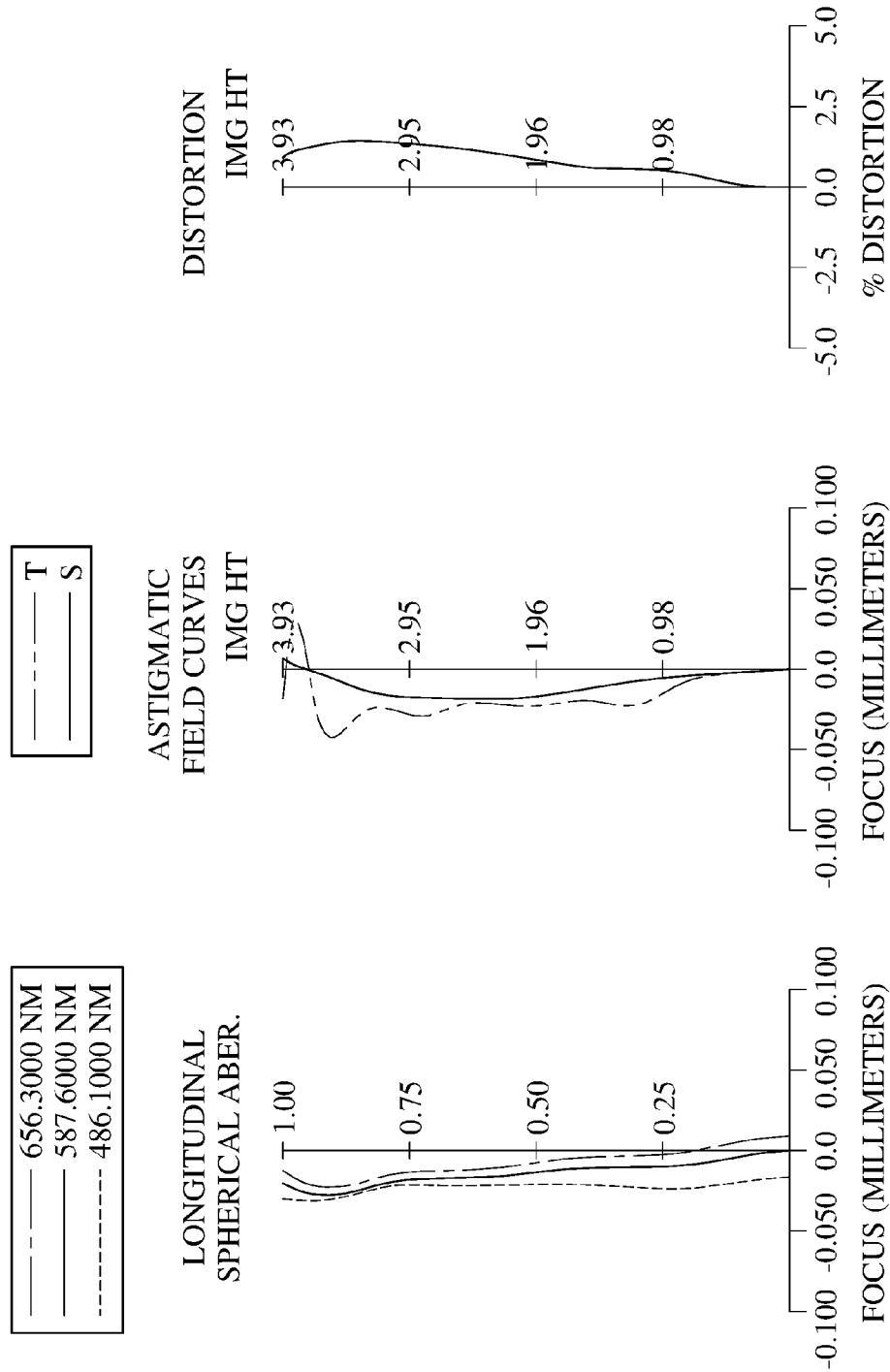
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 390. The optical imaging lens assembly includes, in order from an object side to an image side, an aperture stop 300, a first lens element 310, a second lens element 320, a stop 301, a third lens element 330, a fourth lens element 340, a fifth lens element 350, a sixth lens element 360, an IR-cut filter 370 and an image surface 380, wherein the optical imaging lens assembly has a total of six lens elements (310-360). There is an air gap in a paraxial region between every two lens elements of the optical imaging lens assembly that are adjacent to each other. The stop 301 can be a field stop or a glare stop.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. Each of the object-side surface 341 and the image-side surface 342 of the fourth lens element 340 has at least one inflection point.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one inflection point.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one convex shape in an off-axial region thereof.

The IR-cut filter 370 is made of glass material and located between the sixth lens element 360 and the image surface 380, and will not affect the focal length of the optical imaging lens assembly. The image sensor 390 is disposed on or near the image surface 380 of the optical imaging lens assembly.

The detailed optical data of the 3rd embodiment are shown in Table 5 and the aspheric surface data are shown in Table 6 below.

TABLE 5

3rd Embodiment
f = 4.78 mm, Fno = 2.05, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.408 | | | | |
| 2 | Lens 1 | 1.732 | (ASP) | 0.667 | Plastic | 1.544 | 55.9 | 3.87 |
| 3 | | 8.455 | (ASP) | 0.078 | | | | |
| 4 | Lens 2 | 11.130 | (ASP) | 0.260 | Plastic | 1.660 | 20.4 | −9.52 |
| 5 | | 3.980 | (ASP) | 0.287 | | | | |
| 6 | Stop | Plano | | 0.007 | | | | |
| 7 | Lens 3 | 9.873 | (ASP) | 0.490 | Plastic | 1.544 | 55.9 | 116.15 |
| 8 | | 11.498 | (ASP) | 0.378 | | | | |
| 9 | Lens 4 | 5.846 | (ASP) | 0.341 | Plastic | 1.639 | 23.3 | −43.42 |
| 10 | | 4.719 | (ASP) | 0.394 | | | | |
| 11 | Lens 5 | 2.475 | (ASP) | 0.450 | Plastic | 1.544 | 55.9 | 9.78 |
| 12 | | 4.333 | (ASP) | 0.443 | | | | |
| 13 | Lens 6 | 3.596 | (ASP) | 0.533 | Plastic | 1.514 | 56.8 | −5.91 |
| 14 | | 1.564 | (ASP) | 0.500 | | | | |
| 15 | IR-cut filter | Plano | | 0.210 | Glass | 1.517 | 64.2 | — |
| 16 | | Plano | | 0.302 | | | | |
| 17 | Image | Plano | | — | | | | |

Note:
Reference wavelength is 587.6 nm (d-line).
Effective radius of the stop 301 (Surface 6) is 1.080 mm.

TABLE 6

Aspheric Coefficients

| Surface # | | | | | |
|---|---|---|---|---|---|
| 2 | 3 | 4 | 5 | 7 | 8 |
| k = 3.7196E−01 | −4.2095E+01 | 2.6816E+01 | −8.8743E+01 | −2.0842E+01 | 1.7641E+01 |
| A4 = −1.1230E−02 | −6.1071E−02 | −9.5251E−02 | 1.1490E−01 | −6.3291E−02 | −6.8240E−02 |
| A6 = −2.7721E−03 | 4.5866E−02 | 1.2687E−01 | −2.1947E−01 | −1.3178E−02 | 3.6170E−02 |

TABLE 6-continued

Aspheric Coefficients

| A8 = | −5.7758E−03 | 9.3930E−03 | −2.3226E−02 | 4.8615E−01 | 4.6269E−02 | −4.4271E−02 |
| A10 = | −5.5846E−03 | −5.7417E−02 | −7.2231E−02 | −5.6789E−01 | −7.3835E−02 | −1.6435E−02 |
| A12 = | 7.9736E−03 | 3.6916E−02 | 7.0612E−02 | 3.5338E−01 | 5.1714E−02 | 7.7254E−02 |
| A14 = | −5.8472E−03 | −8.7035E−03 | −1.8872E−02 | −8.0400E−02 | −3.5375E−03 | −5.9515E−02 |
| A16 = | — | — | — | — | — | 1.6908E−02 |

| Surface # | | | | | | |
| --- | --- | --- | --- | --- | --- |
| 9 | 10 | 11 | 12 | 13 | 14 |
| k = 4.4077E+00 | −2.1202E+01 | −1.5011E+01 | −6.2436E+01 | −1.5476E+00 | −6.6614E+00 |
| A4 = −1.2257E−01 | −1.3223E−01 | 4.0025E−02 | 3.9468E−02 | −3.0161E−01 | −1.3571E−01 |
| A6 = 6.9073E−02 | 6.7145E−02 | −1.2177E−01 | −9.2988E−02 | 1.3678E−01 | 5.7839E−02 |
| A8 = −2.8139E−02 | 5.9169E−03 | 8.7533E−02 | 6.3506E−02 | −3.4348E−02 | −1.5853E−02 |
| A10 = −2.3998E−02 | −4.3672E−02 | −3.7035E−02 | −2.5966E−02 | 5.4802E−03 | 2.7663E−03 |
| A12 = 1.8326E−02 | 2.7089E−02 | 7.3166E−03 | 6.0580E−03 | −5.5410E−04 | −2.9995E−04 |
| A14 = −3.5977E−03 | −6.6310E−03 | −4.6464E−04 | −7.3735E−04 | 3.2515E−05 | 1.8426E−05 |
| A16 = — | 5.7174E−04 | −1.0090E−05 | 3.6334E−05 | −8.4498E−07 | −4.8553E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
| --- | --- | --- | --- |
| f [mm] | 4.78 | T45/T23 | 1.34 |
| Fno | 2.05 | TL/ImgH | 1.36 |
| HFOV [deg.] | 39.2 | \|f/f3\| + \|f/f4\| | 0.15 |
| (R3 + R4)/(R3 − R4) | 2.11 | \|f/f5\| + \|f/f6\| | 1.30 |
| \|R8/f\| + \|R10/f\| + \|R12/f\| | 2.22 | \|f6/f2\| | 0.62 |
| (CT4/T34) + (CT4/T45) | 1.77 | f/R8 | 1.01 |
| CT6/T45 | 1.35 | f/R10 | 1.10 |
| (T45/T23) + (T45/T34) | 2.38 | — | — |

4th Embodiment

Figure 7:
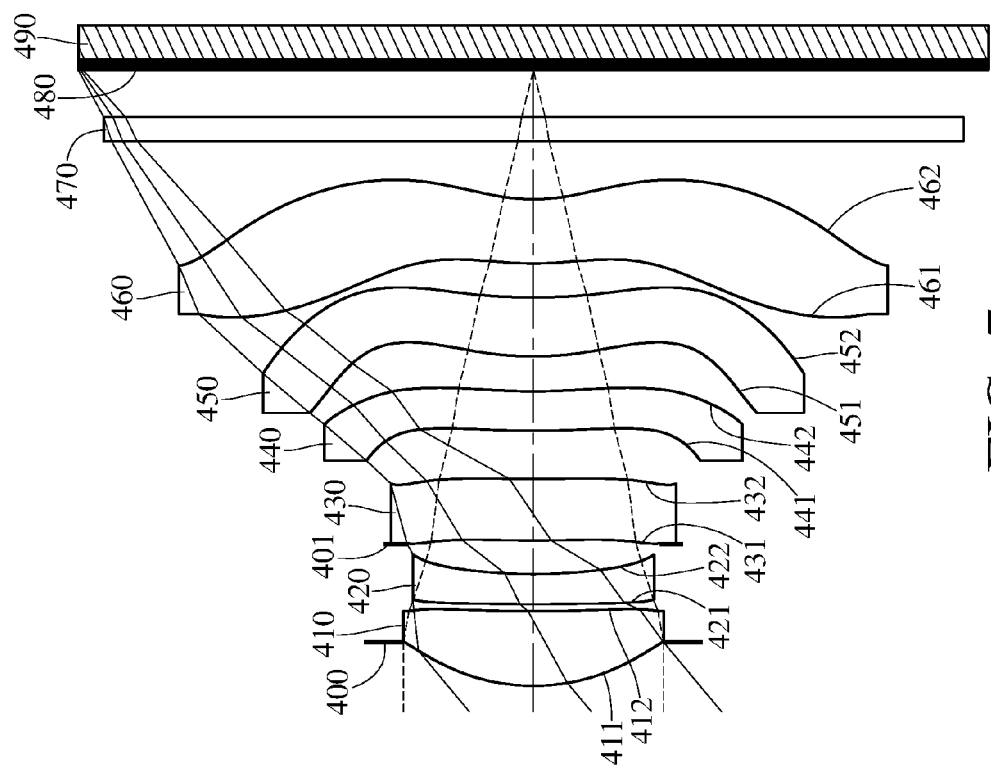
FIG. 7 is a schematic view of an image capturing unit according to the 4th embodiment of the present disclosure.
Figure 8:
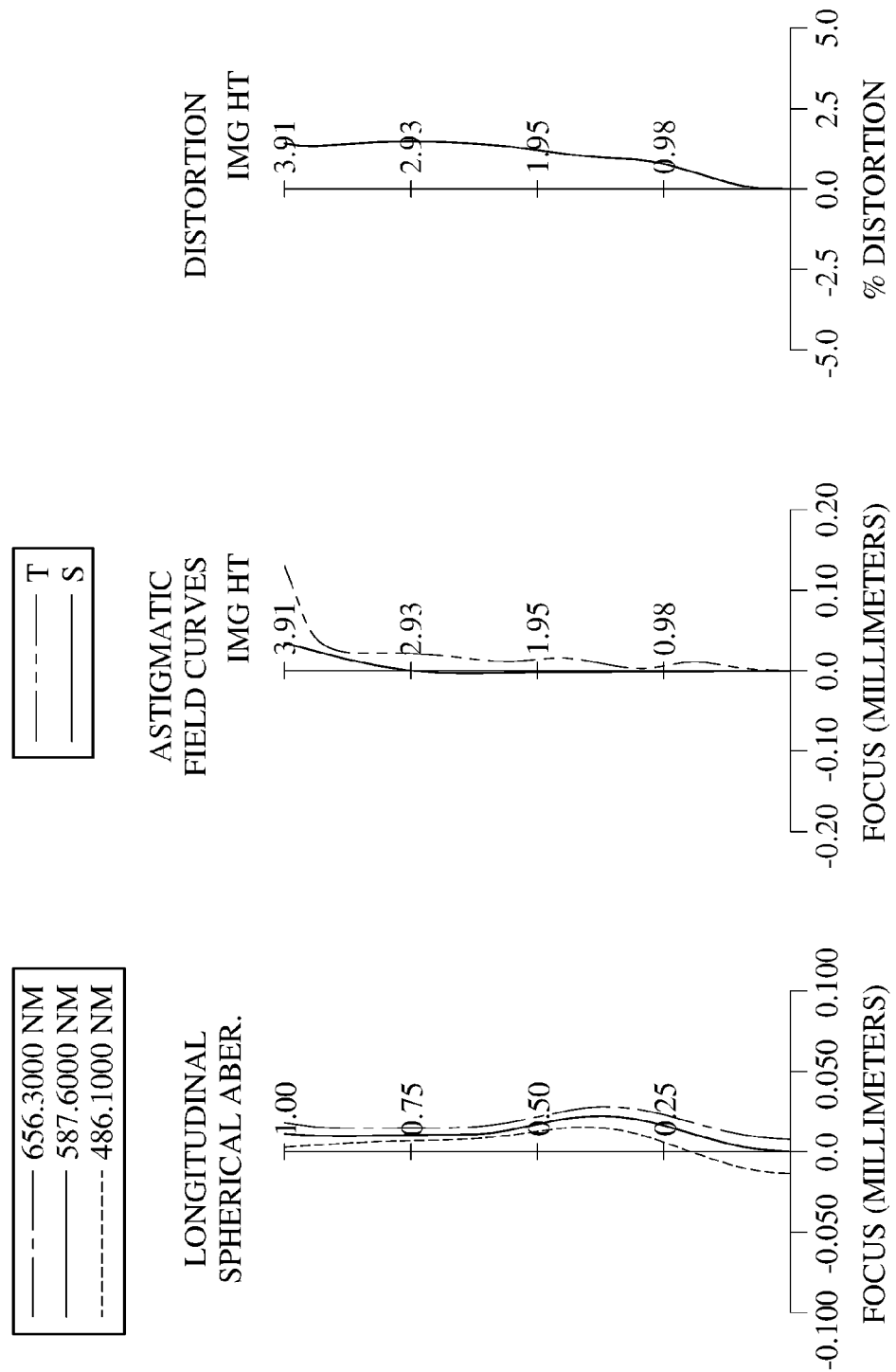
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 490. The optical imaging lens assembly includes, in order from an object side to an image side, an aperture stop 400, a first lens element 410, a second lens element 420, a stop 401, a third lens element 430, a fourth lens element 440, a fifth lens element 450, a sixth lens element 460, a IR-cut filter 470 and an image surface 480, wherein the optical imaging lens assembly has a total of six lens elements (410-460). There is an air gap in a paraxial region between every two lens elements of the optical imaging lens assembly that are adjacent to each other. The stop 401 can be a field stop or a glare stop.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. Each of the object-side surface 441 and the image-side surface 442 of the fourth lens element 440 has at least one inflection point.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one inflection point.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one convex shape in an off-axial region thereof.

The IR-cut filter 470 is made of glass material and located between the sixth lens element 460 and the image surface 480, and will not affect the focal length of the optical imaging lens assembly. The image sensor 490 is disposed on or near the image surface 480 of the optical imaging lens assembly.

The detailed optical data of the 4th embodiment are shown in Table 7 and the aspheric surface data are shown in Table 8 below.

TABLE 7

4th Embodiment
f = 4.60 mm, Fno = 2.05, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.376 | | | | |
| 2 | Lens 1 | 1.727 | (ASP) | 0.644 | Plastic | 1.544 | 55.9 | 3.86 |
| 3 | | 8.485 | (ASP) | 0.062 | | | | |
| 4 | Lens 2 | 13.486 | (ASP) | 0.260 | Plastic | 1.660 | 20.4 | −10.02 |
| 5 | | 4.403 | (ASP) | 0.259 | | | | |
| 6 | Stop | Plano | | 0.031 | | | | |
| 7 | Lens 3 | 11.521 | (ASP) | 0.532 | Plastic | 1.544 | 55.9 | 53.30 |
| 8 | | 18.813 | (ASP) | 0.416 | | | | |
| 9 | Lens 4 | 6.502 | (ASP) | 0.340 | Plastic | 1.639 | 23.3 | −21.78 |
| 10 | | 4.341 | (ASP) | 0.302 | | | | |
| 11 | Lens 5 | 2.647 | (ASP) | 0.510 | Plastic | 1.544 | 55.9 | 9.10 |
| 12 | | 5.302 | (ASP) | 0.293 | | | | |
| 13 | Lens 6 | 2.850 | (ASP) | 0.555 | Plastic | 1.514 | 56.8 | −7.11 |
| 14 | | 1.495 | (ASP) | 0.500 | | | | |
| 15 | IR-cut filter | Plano | | 0.210 | Glass | 1.517 | 64.2 | — |
| 16 | | Plano | | 0.404 | | | | |
| 17 | Image | Plano | | — | | | | — |

Note:
Reference wavelength is 587.6 nm (d-line).
Effective radius of the stop 401 (Surface 6) is 1.090 mm.

TABLE 8

Aspheric Coefficients

| | Surface # | | | | | |
|---|---|---|---|---|---|---|
| | 2 | 3 | 4 | 5 | 7 | 8 |
| k = | 3.6170E−01 | −4.2095E+01 | 2.6816E+01 | −8.8743E+01 | −2.0842E+01 | 1.7641E+01 |
| A4 = | −1.6712E−02 | −8.3989E−02 | −1.1570E−01 | 7.0987E−02 | −7.4264E−02 | −5.7378E−02 |
| A6 = | 1.8997E−02 | 1.1837E−01 | 2.2639E−01 | −8.1657E−02 | −6.9909E−03 | 2.4054E−03 |
| A8 = | −4.7741E−02 | −1.3176E−01 | −2.3589E−01 | 1.9306E−01 | 2.2655E−02 | 1.4352E−02 |
| A10 = | 3.2878E−02 | 1.1851E−01 | 2.0044E−01 | −2.0076E−01 | −4.9203E−02 | −8.6507E−02 |
| A12 = | −7.7486E−03 | −8.4491E−02 | −1.1378E−01 | 1.0992E−01 | 3.8811E−02 | 1.2582E−01 |
| A14 = | −5.0674E−03 | 2.3543E−02 | 3.0114E−02 | −1.5623E−02 | 9.4417E−04 | −7.6133E−02 |
| A16 = | — | — | — | — | — | 1.9078E−02 |

| | Surface # | | | | | |
|---|---|---|---|---|---|---|
| | 9 | 10 | 11 | 12 | 13 | 14 |
| k = | 4.4070E+00 | −2.1784E+01 | −1.0272E+01 | −9.0000E+01 | −2.0868E+00 | −5.7879E+00 |
| A4 = | −1.0738E−01 | −1.1871E−01 | 4.1893E−02 | 1.1118E−01 | −2.5018E−01 | −1.1760E−01 |
| A6 = | 8.7512E−02 | 5.9289E−02 | −1.2308E−01 | −1.5302E−01 | 9.9955E−02 | 4.2670E−02 |
| A8 = | −5.8650E−02 | 1.6128E−02 | 6.8068E−02 | 8.4993E−02 | −2.1541E−02 | −1.0239E−02 |
| A10 = | 6.4362E−03 | −4.3570E−02 | −1.7152E−02 | −2.8556E−02 | 2.8356E−03 | 1.6377E−03 |
| A12 = | 1.4098E−03 | 2.2124E−02 | −4.8239E−04 | 5.7259E−03 | −2.2784E−04 | −1.7053E−04 |
| A14 = | −1.2081E−04 | −4.6176E−03 | 9.5646E−04 | −6.2380E−04 | 1.0380E−05 | 1.0332E−05 |
| A16 = | — | 3.4609E−04 | −1.1200E−04 | 2.8238E−05 | −2.0800E−07 | −2.6823E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | | |
|---|---|---|---|---|
| f [mm] | 4.60 | T45/T23 | 1.04 | |
| Fno | 2.05 | TL/ImgH | 1.36 | |

-continued

| 4th Embodiment | | | |
|---|---|---|---|
| HFOV [deg.] | 39.9 | |f/f3| + |f/f4| | 0.30 |
| (R3 + R4)/(R3 − R4) | 1.97 | |f/f5| + |f/f6| | 1.15 |
| |R8/f| + |R10/f| + |R12/f| | 2.42 | |f6/f2| | 0.71 |
| (CT4/T34) + (CT4/T45) | 1.94 | f/R8 | 1.06 |
| CT6/T45 | 1.84 | f/R10 | 0.87 |
| (T45/T23) + (T45/T34) | 1.77 | — | — |

5th Embodiment

Figure 9:
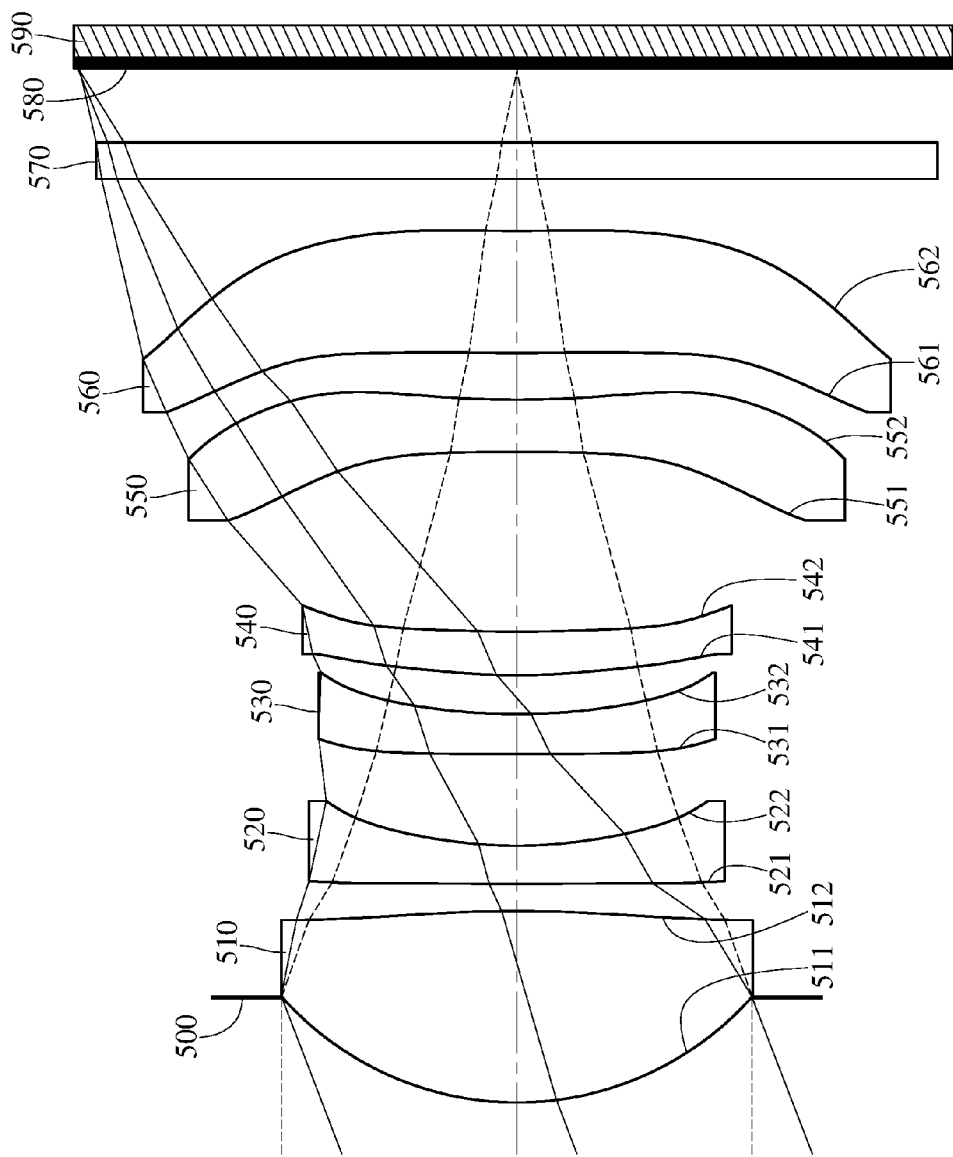
FIG. 9 is a schematic view of an image capturing unit according to the 5th embodiment of the present disclosure.

FIG. 9 is a schematic view of an image capturing unit according to the 5th embodiment of the present disclosure.

Figure 10:
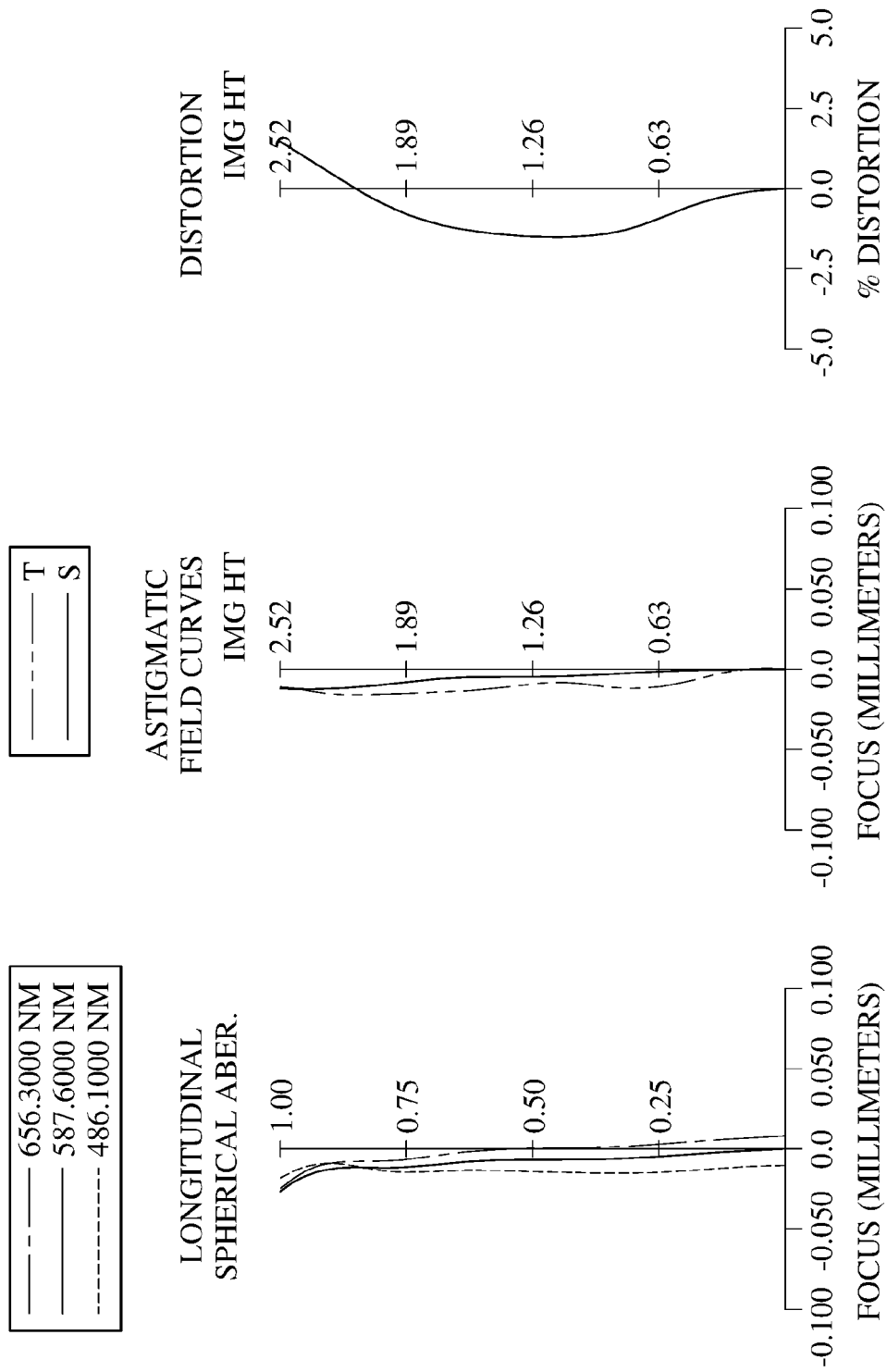
FIG. 10 shows spherical aberration curves, astigmatic field curves and a distortion curve of the image capturing unit according to the 5th embodiment.

FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 590. The optical imaging lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580, wherein the optical imaging lens assembly has a total of six lens elements (510-560). There is an air gap in a paraxial region between every two lens elements of the optical imaging lens assembly that are adjacent to each other.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. Each of the object-side surface 541 and the image-side surface 542 of the fourth lens element 540 has at least one inflection point.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one inflection point.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one convex shape in an off-axial region thereof.

The IR-cut filter 570 is made of glass material and located between the sixth lens element 560 and the image surface 580, and will not affect the focal length of the optical imaging lens assembly. The image sensor 590 is disposed on or near the image surface 580 of the optical imaging lens assembly.

The detailed optical data of the 5th embodiment are shown in Table 9 and the aspheric surface data are shown in Table 10 below.

TABLE 9

5th Embodiment
f = 6.48 mm, Fno = 2.40, HFOV = 21.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.604 | | | | |
| 2 | Lens 1 | 1.796 | (ASP) | 1.100 | Plastic | 1.544 | 56.0 | 2.76 |
| 3 | | −7.234 | (ASP) | 0.155 | | | | |
| 4 | Lens 2 | 20.009 | (ASP) | 0.220 | Plastic | 1.660 | 20.4 | −4.44 |
| 5 | | 2.545 | (ASP) | 0.527 | | | | |
| 6 | Lens 3 | 748.649 | (ASP) | 0.230 | Plastic | 1.545 | 55.9 | −6.62 |
| 7 | | 3.590 | (ASP) | 0.223 | | | | |
| 8 | Lens 4 | 3.549 | (ASP) | 0.250 | Plastic | 1.635 | 23.4 | 9.36 |
| 9 | | 8.567 | (ASP) | 1.033 | | | | |
| 10 | Lens 5 | −18.036 | (ASP) | 0.300 | Plastic | 1.545 | 55.9 | −8.15 |
| 11 | | 5.924 | (ASP) | 0.269 | | | | |
| 12 | Lens 6 | 16.255 | (ASP) | 0.700 | Plastic | 1.635 | 23.4 | −50.06 |
| 13 | | 10.575 | (ASP) | 0.300 | | | | |
| 14 | IR-cut filter | Plano | | 0.210 | Glass | 1.517 | 64.2 | — |
| 15 | | Plano | | 0.423 | | | | |
| 16 | Image | Plano | | — | | | | |

Note:
Reference wavelength is 587.6 nm (d-line).

TABLE 10

Aspheric Coefficients

| Surface # | | | | | |
|---|---|---|---|---|---|
| 2 | 3 | 4 | 5 | 6 | 7 |
| k = 1.0527E−01 | 2.3549E+01 | −3.5874E+01 | −6.4217E+00 | −9.0000E+01 | −1.8101E+01 |
| A4 = −3.0251E−03 | 3.7541E−02 | −6.9268E−02 | −4.1031E−02 | 4.4283E−02 | 3.1310E−02 |

TABLE 10-continued

| Aspheric Coefficients | | | | | |
|---|---|---|---|---|---|
| A6 = | −1.0824E−03 | −3.2226E−03 | 8.9142E−02 | 9.8495E−02 | −3.3992E−02 | −8.6299E−03 |
| A8 = | 3.4227E−05 | 6.7503E−04 | −5.7727E−02 | −6.6890E−02 | 6.6856E−02 | 8.8587E−02 |
| A10 = | −2.4207E−04 | 8.8084E−04 | 2.8282E−02 | 5.8486E−02 | −6.3953E−02 | −1.3040E−01 |
| A12 = | — | — | −7.4409E−03 | −1.8536E−02 | 5.3941E−02 | 1.0190E−01 |
| A14 = | — | — | — | — | −2.0305E−02 | −2.8955E−02 |

| | Surface # | | | | | |
|---|---|---|---|---|---|---|
| | 8 | 9 | 10 | 11 | 12 | 13 |
| k = | 3.1751E−01 | 3.1372E+01 | 5.1844E+01 | 1.6900E+00 | 2.7170E+01 | −9.0000E+01 |
| A4 = | −1.1091E−01 | −5.0703E−02 | −1.0298E−02 | 2.2854E−03 | −1.2235E−01 | −1.6561E−01 |
| A6 = | 6.8010E−03 | −2.0185E−03 | −1.6727E−01 | −7.1562E−02 | 2.0073E−01 | 1.4232E−01 |
| A8 = | 1.7209E−01 | 1.2113E−01 | 1.5683E−01 | 2.6021E−02 | −1.8635E−01 | −8.4171E−02 |
| A10 = | −1.7417E−01 | −6.6737E−02 | −6.4102E−02 | −9.2101E−04 | 8.6810E−02 | 2.8778E−02 |
| A12 = | 6.7451E−02 | −3.7011E−03 | 1.2765E−02 | −7.9655E−04 | −2.1667E−02 | −5.7442E−03 |
| A14 = | −1.0923E−02 | 5.5253E−03 | −9.3407E−04 | 1.6240E−06 | 2.8006E−03 | 6.3145E−04 |
| A16 = | — | — | −1.4479E−05 | 1.8871E−05 | −1.4788E−04 | −2.9459E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.48 | T45/T23 | 1.96 |
| Fno | 2.40 | TL/ImgH | 2.36 |
| HFOV [deg.] | 21.0 | \|f/f3\| + \|f/f4\| | 1.67 |
| (R3 + R4)/(R3 − R4) | 1.29 | \|f/f5\| + \|f/f6\| | 0.92 |
| \|R8/f\| + \|R10/f\| + \|R12/f\| | 3.87 | \|f6/f2\| | 11.27 |
| (CT4/T34) + (CT4/T45) | 1.36 | f/R8 | 0.76 |
| CT6/T45 | 0.68 | f/R10 | 1.09 |
| (T45/T23) + (T45/T34) | 6.59 | — | — |

6th Embodiment

Figure 11:
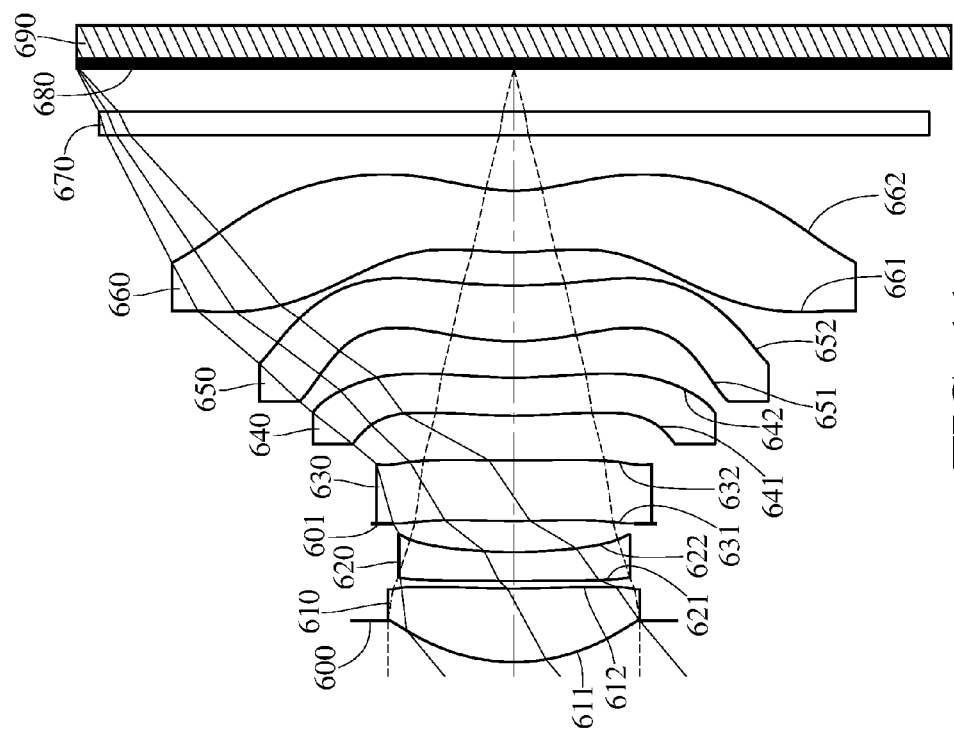
FIG. 11 is a schematic view of an image capturing unit according to the 6th embodiment of the present disclosure.
Figure 12:
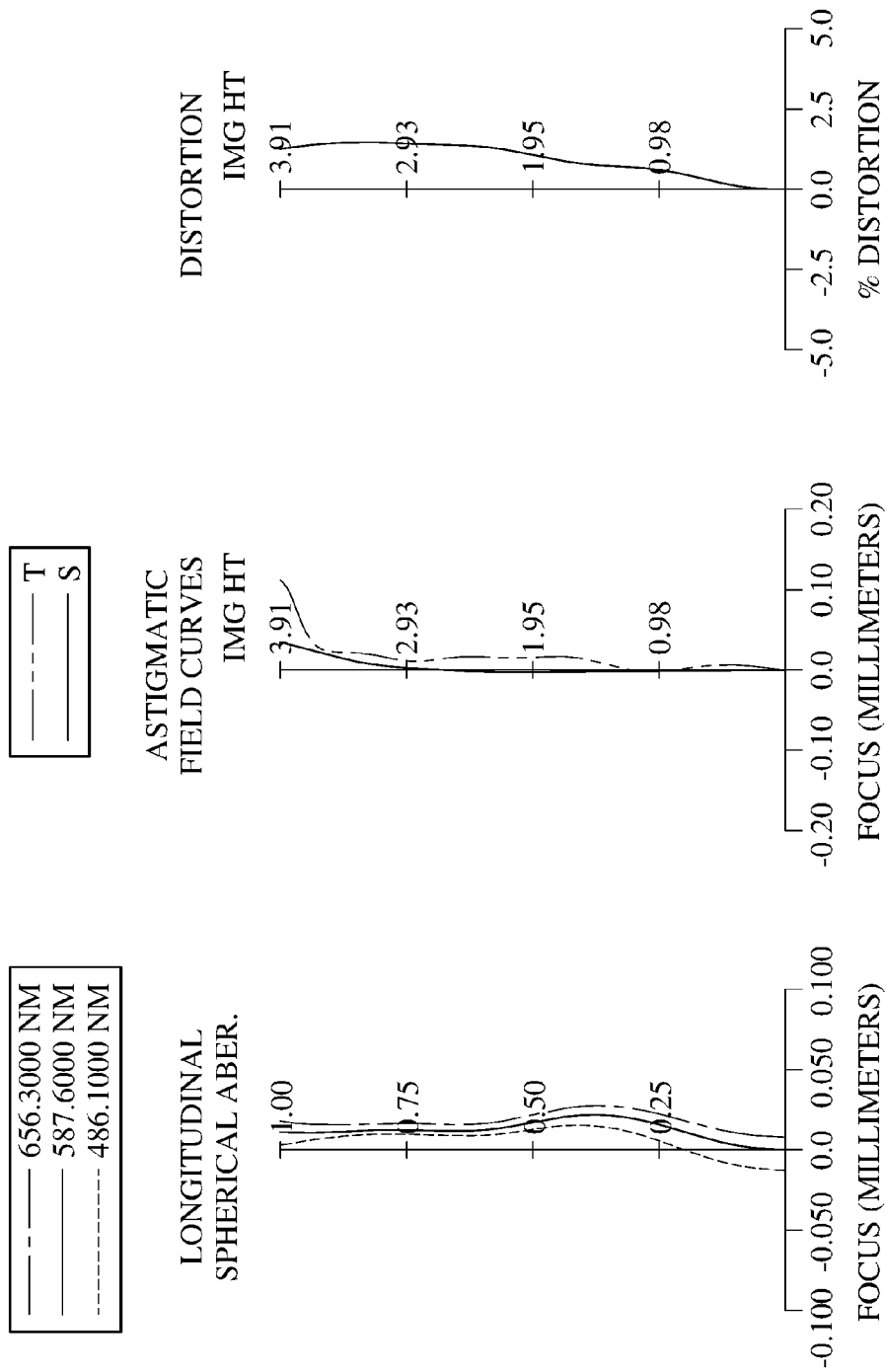
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 690. The optical imaging lens assembly includes, in order from an object side to an image side, an aperture stop 600, a first lens element 610, a second lens element 620, a stop 601, a third lens element 630, a fourth lens element 640, a fifth lens element 650, a sixth lens element 660, an IR-cut filter 670 and an image surface 680, wherein the optical imaging lens assembly has a total of six lens elements (610-660). There is an air gap in a paraxial region between every two lens elements of the optical imaging lens assembly that are adjacent to each other. The stop 601 can be a field stop or a glare stop.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. Each of the object-side surface 641 and the image-side surface 642 of the fourth lens element 640 has at least one inflection point.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one inflection point.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one convex shape in an off-axial region thereof.

The IR-cut filter 670 is made of glass material and located between the sixth lens element 660 and the image surface 680, and will not affect the focal length of the optical imaging lens assembly. The image sensor 690 is disposed on or near the image surface 680 of the optical imaging lens assembly.

The detailed optical data of the 6th embodiment are shown in Table 11 and the aspheric surface data are shown in Table 12 below.

TABLE 11

6th Embodiment
f = 4.63 mm, Fno = 2.05, HFOV = 39.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.370 | | | | |
| 2 | Lens 1 | 1.729 | (ASP) | 0.659 | Plastic | 1.544 | 55.9 | 3.81 |
| 3 | | 9.035 | (ASP) | 0.067 | | | | |
| 4 | Lens 2 | 14.418 | (ASP) | 0.260 | Plastic | 1.660 | 20.4 | −9.63 |
| 5 | | 4.418 | (ASP) | 0.255 | | | | |
| 6 | Stop | Plano | | 0.024 | | | | |
| 7 | Lens 3 | 10.887 | (ASP) | 0.543 | Plastic | 1.544 | 55.9 | 72.11 |
| 8 | | 14.807 | (ASP) | 0.401 | | | | |
| 9 | Lens 4 | 5.123 | (ASP) | 0.340 | Plastic | 1.639 | 23.3 | −21.31 |
| 10 | | 3.626 | (ASP) | 0.327 | | | | |
| 11 | Lens 5 | 2.442 | (ASP) | 0.499 | Plastic | 1.544 | 55.9 | 8.30 |
| 12 | | 4.936 | (ASP) | 0.299 | | | | |
| 13 | Lens 6 | 3.186 | (ASP) | 0.551 | Plastic | 1.514 | 56.8 | −6.58 |
| 14 | | 1.544 | (ASP) | 0.500 | | | | |
| 15 | IR-cut filter | Plano | | 0.210 | Glass | 1.517 | 64.2 | — |
| 16 | | Plano | | 0.386 | | | | |
| 17 | Image | Plano | | — | | | | |

Note:
Reference wavelength is 587.6 nm (d-line).
Effective radius of the stop 601 (Surface 6) is 1.080 mm.

TABLE 12

Aspheric Coefficients

| | Surface # | | | | | |
|---|---|---|---|---|---|---|
| | 2 | 3 | 4 | 5 | 7 | 8 |
| k = | 3.5351E−01 | −4.3364E+01 | 2.6416E+01 | −8.9542E+01 | −2.0443E+01 | 1.4135E+01 |
| A4 = | −1.6424E−02 | −8.1812E−02 | −1.1409E−01 | 6.6644E−02 | −7.8534E−02 | −7.1722E−02 |
| A6 = | 1.5606E−02 | 1.0262E−01 | 2.2086E−01 | −7.2179E−02 | 1.5150E−02 | 6.5242E−02 |
| A8 = | −4.1801E−02 | −9.0757E−02 | −2.0440E−01 | 1.8785E−01 | −2.7145E−02 | −1.3525E−01 |
| A10 = | 2.6950E−02 | 5.4847E−02 | 1.4058E−01 | −1.9700E−01 | 2.3655E−02 | 1.2756E−01 |
| A12 = | −5.5848E−03 | −3.9503E−02 | −6.9101E−02 | 1.0033E−01 | −1.7214E−02 | −4.9635E−02 |
| A14 = | −5.1596E−03 | 1.2062E−02 | 1.8564E−02 | −9.5004E−03 | 1.7849E−02 | −2.4473E−04 |
| A16 = | — | — | — | — | — | 5.5548E−03 |

| | Surface # | | | | | |
|---|---|---|---|---|---|---|
| | 9 | 10 | 11 | 12 | 13 | 14 |
| k = | 4.0102E+00 | −2.4189E+01 | −1.5158E+01 | −6.3003E+01 | −1.9680E+00 | −6.7562E+00 |
| A4 = | −1.4856E−01 | −1.4537E−01 | 5.6683E−02 | 6.5349E−02 | −2.8448E−01 | −1.2310E−01 |
| A6 = | 1.5865E−01 | 1.2412E−01 | −1.6134E−01 | −1.2476E−01 | 1.2325E−01 | 4.7921E−02 |
| A8 = | −1.4469E−01 | −5.8014E−02 | 1.2178E−01 | 7.8512E−02 | −2.9115E−02 | −1.1538E−02 |
| A10 = | 6.4310E−02 | 1.5844E−03 | −5.5589E−02 | −2.9947E−02 | 4.2998E−03 | 1.7295E−03 |
| A12 = | −1.8552E−02 | 6.8452E−03 | 1.3773E−02 | 6.7760E−03 | −3.9715E−04 | −1.6297E−04 |
| A14 = | 2.6202E−03 | −1.8521E−03 | −1.7223E−03 | −8.2755E−04 | 2.1133E−05 | 9.0496E−06 |
| A16 = | — | 1.3122E−04 | 9.1733E−05 | 4.1939E−05 | −4.9745E−07 | −2.2505E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.63 | T45/T23 | 1.17 |
| Fno | 2.05 | TL/ImgH | 1.36 |

-continued

| 6th Embodiment | | | |
|---|---|---|---|
| HFOV [deg.] | 39.8 | \|f/f3\| + \|f/f4\| | 0.28 |
| (R3 + R4)/(R3 − R4) | 1.85 | \|f/f5\| + \|f/f6\| | 1.26 |
| \|R8/f\| + \|R10/f\| + \|R12/f\| | 2.18 | \|f6/f2\| | 0.68 |
| (CT4/T34) + (CT4/T45) | 1.89 | f/R8 | 1.28 |
| CT6/T45 | 1.69 | f/R10 | 0.94 |
| (T45/T23) + (T45/T34) | 1.99 | | |

7th Embodiment

Figure 13:
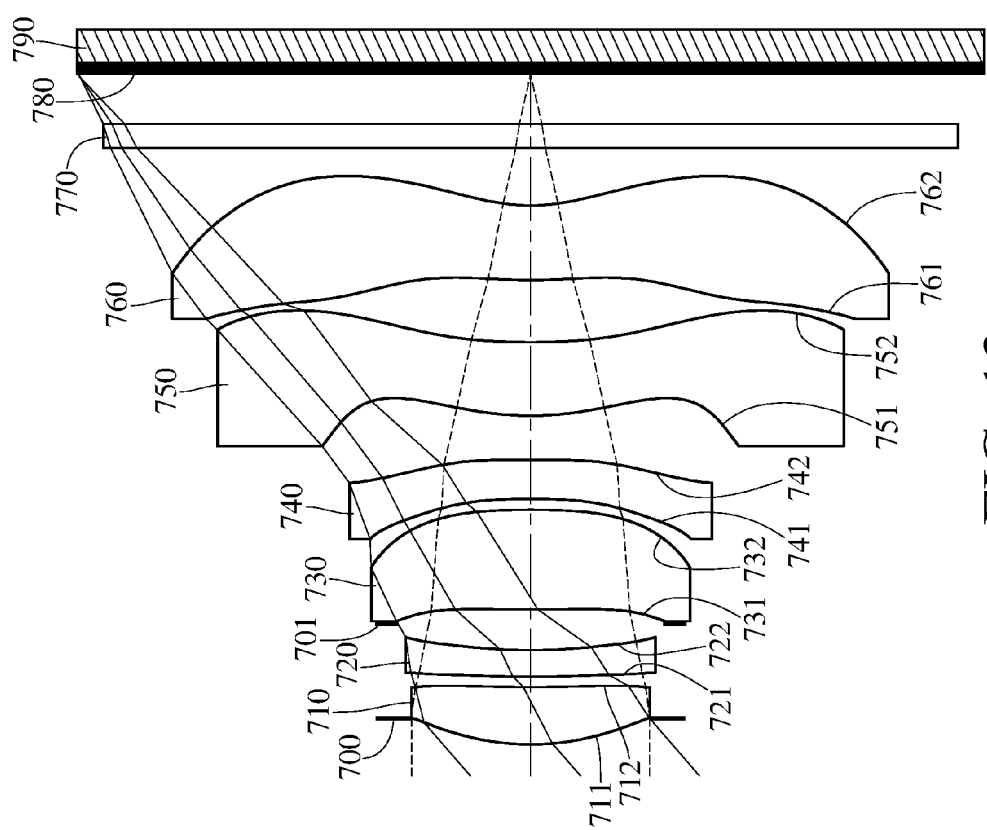
FIG. 13 is a schematic view of an image capturing unit according to the 7th embodiment of the present disclosure.
Figure 14:
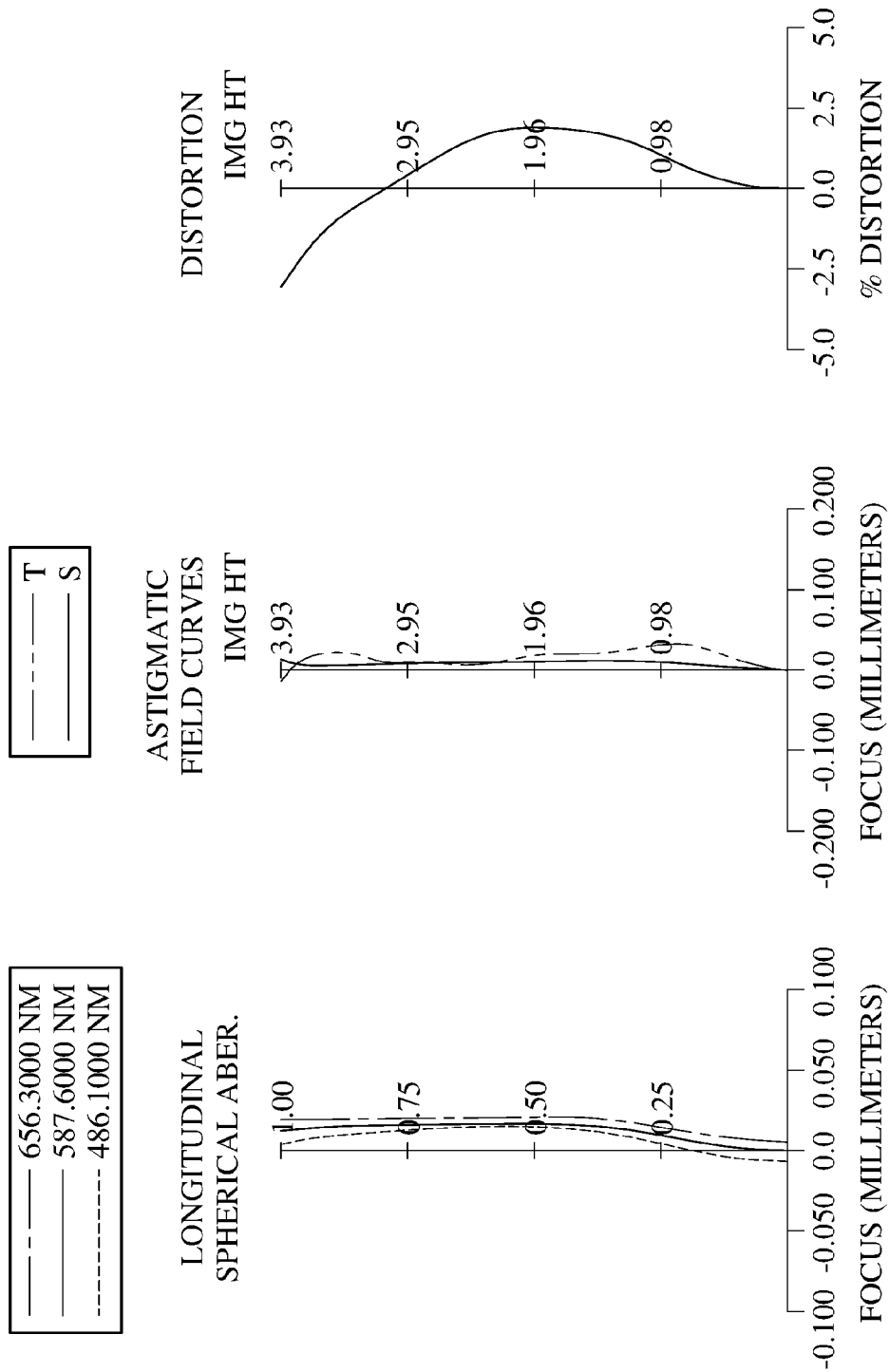
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 790. The optical imaging lens assembly includes, in order from an object side to an image side, an aperture stop 700, a first lens element 710, a second lens element 720, a stop 701, a third lens element 730, a fourth lens element 740, a fifth lens element 750, a sixth lens element 760, an IR-cut filter 770 and an image surface 780, wherein the optical imaging lens assembly has a total of six lens elements (710-760). There is an air gap in a paraxial region between every two lens elements of the optical imaging lens assembly that are adjacent to each other. The stop 701 can be a field stop or a glare stop.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has at least one inflection point.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one inflection point.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one convex shape in an off-axial region thereof.

The IR-cut filter 770 is made of glass material and located between the sixth lens element 760 and the image surface 780, and will not affect the focal length of the optical imaging lens assembly. The image sensor 790 is disposed on or near the image surface 780 of the optical imaging lens assembly.

The detailed optical data of the 7th embodiment are shown in Table 13 and the aspheric surface data are shown in Table 14 below.

TABLE 13

7th Embodiment
f = 4.65 mm, Fno = 2.25, HFOV = 41.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.227 | | | | |
| 2 | Lens 1 | 2.220 | (ASP) | 0.499 | Plastic | 1.544 | 55.9 | 4.85 |
| 3 | | 12.875 | (ASP) | 0.090 | | | | |
| 4 | Lens 2 | 8.931 | (ASP) | 0.230 | Plastic | 1.660 | 20.4 | −13.63 |
| 5 | | 4.436 | (ASP) | 0.227 | | | | |
| 6 | Stop | Plano | | 0.127 | | | | |
| 7 | Lens 3 | 20.786 | (ASP) | 0.867 | Plastic | 1.544 | 55.9 | 10.67 |
| 8 | | −7.930 | (ASP) | 0.094 | | | | |
| 9 | Lens 4 | −8.492 | (ASP) | 0.340 | Plastic | 1.639 | 23.5 | −12.40 |
| 10 | | 119.274 | (ASP) | 0.383 | | | | |
| 11 | Lens 5 | 2.504 | (ASP) | 0.640 | Plastic | 1.544 | 55.9 | 7.03 |
| 12 | | 6.600 | (ASP) | 0.541 | | | | |
| 13 | Lens 6 | 4.648 | (ASP) | 0.648 | Plastic | 1.515 | 56.5 | −5.02 |
| 14 | | 1.581 | (ASP) | 0.500 | | | | |
| 15 | IR-cut filter | Plano | | 0.210 | Glass | 1.517 | 64.2 | — |
| 16 | | Plano | | 0.433 | | | | |
| 17 | Image | Plano | | — | | | | |

Note:
Reference wavelength is 587.6 nm (d-line).
Effective radius of the stop 701 (Surface 6) is 1.150 mm.

TABLE 14

Aspheric Coefficients

| Surface # | | | | | |
|---|---|---|---|---|---|
| 2 | 3 | 4 | 5 | 7 | 8 |
| k = 8.4354E−02 | −9.0000E+01 | −9.0045E+01 | −5.9272E+01 | 0.0000E+00 | 2.5234E+01 |
| A4 = −7.2292E−03 | −3.9683E−02 | −6.0139E−02 | 2.5945E−02 | −4.1470E−02 | −8.3078E−02 |

TABLE 14-continued

| Aspheric Coefficients | | | | | | |
|---|---|---|---|---|---|---|
| A6 = | 3.7503E−04 | 1.9007E−02 | 6.0184E−02 | −6.7546E−02 | −2.7369E−02 | −5.8574E−02 |
| A8 = | −1.8710E−02 | −1.2395E−03 | −7.6317E−03 | 1.2511E−01 | −8.9222E−03 | 1.4240E−01 |
| A10 = | 1.7132E−02 | −1.8327E−02 | −1.6924E−02 | −1.1749E−01 | 1.7235E−02 | −1.4006E−01 |
| A12 = | −1.0671E−02 | 7.3977E−03 | 1.6099E−02 | 6.1407E−02 | −2.1045E−02 | 6.9575E−02 |
| A14 = | −4.8699E−04 | −3.2869E−03 | −5.9310E−03 | −1.0926E−02 | 1.1088E−02 | −1.7595E−02 |
| A16 = | — | — | — | — | — | 1.6967E−03 |

| | Surface # | | | | | |
|---|---|---|---|---|---|---|
| | 9 | 10 | 11 | 12 | 13 | 14 |
| k = | 1.3778E+01 | −1.4264E+00 | −1.4471E+01 | −7.3793E+01 | −1.6851E+00 | −5.5848E+00 |
| A4 = | −1.8112E−01 | −1.9998E−01 | 4.2848E−02 | 8.4772E−02 | −1.5660E−01 | −5.9563E−02 |
| A6 = | 6.3472E−02 | 1.3088E−01 | −7.7179E−02 | −4.6902E−02 | 5.0707E−02 | 1.4861E−02 |
| A8 = | 1.1265E−01 | −2.6058E−02 | 4.7902E−02 | 1.0655E−02 | −4.2214E−02 | −2.0712E−03 |
| A10 = | −1.2853E−01 | −6.6194E−03 | −2.5059E−02 | −8.7444E−04 | −9.1651E−04 | 1.7534E−05 |
| A12 = | 5.3255E−02 | 5.7023E−03 | 8.2103E−03 | −7.9496E−05 | 2.2746E−04 | 3.0545E−05 |
| A14 = | −8.7203E−03 | −1.9728E−03 | −1.6428E−03 | 1.9545E−05 | −1.7922E−05 | −3.3670E−06 |
| A16 = | — | 3.0964E−04 | 1.5748E−04 | −1.0023E−06 | 4.8789E−07 | 1.1341E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.65 | T45/T23 | 1.08 |
| Fno | 2.25 | TL/ImgH | 1.48 |
| HFOV [deg.] | 41.0 | \|f/f3\| + \|f/f4\| | 0.81 |
| (R3 + R4)/(R3 − R4) | 2.97 | \|f/f5\| + \|f/f6\| | 1.59 |
| \|R8/f\| + \|R10/f\| + \|R12/f\| | 27.41 | \|f6/f2\| | 0.37 |
| (CT4/T34) + (CT4/T45) | 4.50 | f/R8 | 0.04 |
| CT6/T45 | 1.69 | f/R10 | 0.70 |
| (T45/T23) + (T45/T34) | 5.16 | — | — |

8th Embodiment

Figure 15:
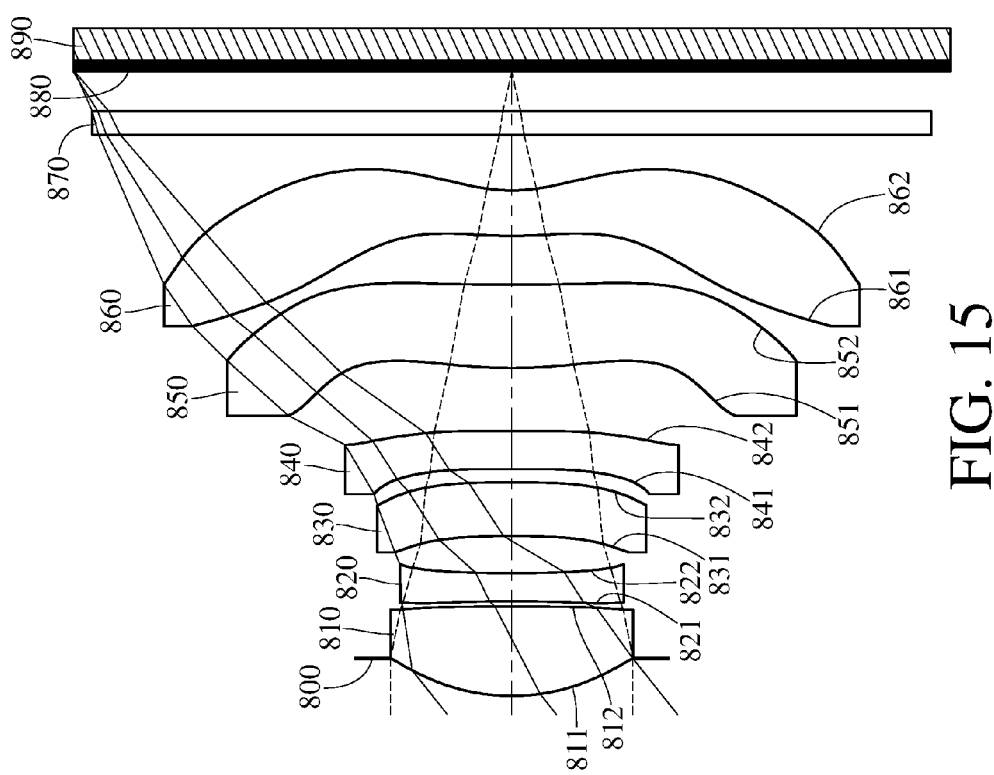
FIG. 15 is a schematic view of an image capturing unit according to the 8th embodiment of the present disclosure.
Figure 16:
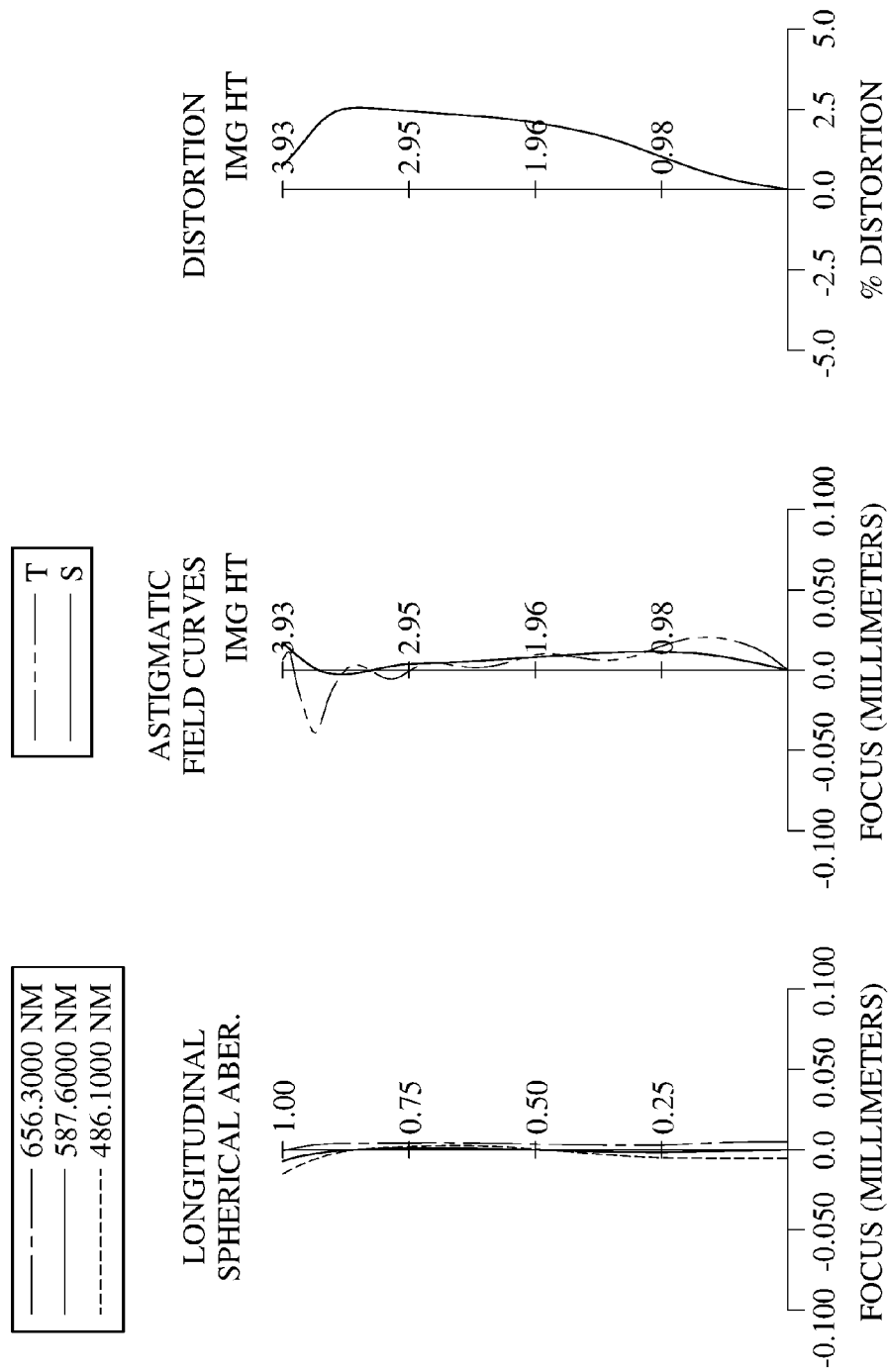
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 890. The optical imaging lens assembly includes, in order from an object side to an image side, an aperture stop 800, a first lens element 810, a second lens element 820, a third lens element 830, a fourth lens element 840, a fifth lens element 850, a sixth lens element 860, an IR-cut filter 870 and an image surface 880, wherein the optical imaging lens assembly has a total of six lens elements (810-860). There is an air gap in a paraxial region between every two lens elements of the optical imaging lens assembly that are adjacent to each other.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. Each of the object-side surface 841 and the image-side surface 842 of the fourth lens element 840 has at least one inflection point.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one inflection point.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one convex shape in an off-axial region thereof.

The IR-cut filter 870 is made of glass material and located between the sixth lens element 860 and the image surface 880, and will not affect the focal length of the optical imaging lens assembly. The image sensor 890 is disposed on or near the image surface 880 of the optical imaging lens assembly.

The detailed optical data of the 8th embodiment are shown in Table 15 and the aspheric surface data are shown in Table 16 below.

TABLE 15

8th Embodiment
f = 4.88 mm, Fno = 2.25, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.335 | | | | |
| 2 | Lens 1 | 1.819 | (ASP) | 0.800 | Plastic | 1.545 | 56.1 | 3.30 |
| 3 | | −118.322 | (ASP) | 0.050 | | | | |
| 4 | Lens 2 | −10.773 | (ASP) | 0.250 | Plastic | 1.660 | 20.4 | −8.57 |
| 5 | | 12.030 | (ASP) | 0.333 | | | | |
| 6 | Lens 3 | −10.842 | (ASP) | 0.482 | Plastic | 1.578 | 36.0 | −37.03 |
| 7 | | −22.330 | (ASP) | 0.119 | | | | |
| 8 | Lens 4 | 26.462 | (ASP) | 0.340 | Plastic | 1.660 | 20.4 | −79.32 |
| 9 | | 17.487 | (ASP) | 0.566 | | | | |
| 10 | Lens 5 | 4.260 | (ASP) | 0.747 | Plastic | 1.545 | 56.1 | 8.78 |
| 11 | | 36.394 | (ASP) | 0.437 | | | | |
| 12 | Lens 6 | 3.613 | (ASP) | 0.408 | Plastic | 1.515 | 56.5 | −4.78 |
| 13 | | 1.407 | (ASP) | 0.500 | | | | |
| 14 | IR-cut filter | Plano | | 0.210 | Glass | 1.517 | 64.2 | — |
| 15 | | Plano | | 0.358 | | | | |
| 16 | Image | Plano | | — | | | | |

Note:
Reference wavelength is 587.6 nm (d-line).
Effective radius of the object-side surface 851 (Surface 10) is 2.000 mm.

TABLE 16

Aspheric Coefficients

| | Surface # | | | | | |
|---|---|---|---|---|---|---|
| | 2 | 3 | 4 | 5 | 6 | 7 |
| k = | 6.5182E−01 | −9.0000E+01 | −8.8110E+01 | −5.8867E+01 | −9.0000E+01 | −2.7917E+01 |
| A4 = | −1.4511E−02 | −3.6107E−02 | −1.6259E−02 | 3.7601E−03 | −9.2746E−02 | −1.4658E−01 |
| A6 = | −8.1773E−03 | 4.4454E−02 | 6.2125E−02 | 5.4300E−02 | 1.7729E−02 | 1.1207E−01 |
| A8 = | −7.9346E−03 | −2.2331E−02 | 1.8454E−02 | −8.5697E−02 | −1.0269E−01 | −1.9507E−02 |
| A10 = | 3.9580E−03 | −2.8832E−02 | −1.1204E−01 | 1.6690E−01 | 2.0688E−01 | −1.5641E−01 |
| A12 = | −2.7864E−03 | 3.0620E−02 | 1.1497E−01 | −2.0776E−01 | −2.0044E−01 | 2.2862E−01 |
| A14 = | −2.3252E−03 | −1.0832E−02 | −3.7823E−02 | 1.4630E−01 | 8.1151E−02 | −1.4000E−01 |
| A16 = | — | — | — | −3.5416E−02 | — | 3.2829E−02 |

| | Surface # | | | | | |
|---|---|---|---|---|---|---|
| | 8 | 9 | 10 | 11 | 12 | 13 |
| k = | 2.4969E+01 | 1.4162E+00 | −1.1629E+01 | 9.0000E+01 | −6.9278E+01 | −7.6911E+00 |
| A4 = | −2.2498E−01 | −1.6623E−01 | −2.7564E−02 | 3.8041E−02 | −1.2093E−01 | −7.3368E−02 |
| A6 = | 2.4880E−01 | 1.5082E−01 | −1.7887E−02 | −6.1005E−02 | 1.2187E−02 | 1.5798E−02 |
| A8 = | −1.6727E−01 | −7.9538E−02 | 1.3985E−03 | 3.2389E−02 | 8.5223E−03 | −1.0468E−03 |
| A10 = | 3.7468E−02 | 2.1067E−02 | 9.3918E−03 | −9.6867E−03 | −2.8907E−03 | −3.8661E−04 |
| A12 = | 1.2702E−02 | −2.9343E−05 | −6.9034E−03 | 1.6044E−03 | 3.8813E−04 | 1.0508E−04 |
| A14 = | −9.3302E−03 | −1.7802E−03 | 1.7871E−03 | −1.3547E−04 | −2.4758E−05 | −1.0052E−05 |
| A16 = | — | 4.3231E−04 | −1.5491E−04 | 4.5016E−06 | 6.1969E−07 | 3.4168E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

8th Embodiment

| | | | |
|---|---|---|---|
| f [mm] | 4.88 | T45/T23 | 1.70 |
| Fno | 2.25 | TL/ImgH | 1.43 |

-continued

8th Embodiment

| | | | |
|---|---|---|---|
| HFOV [deg.] | 38.6 | \|f/f3\| + \|f/f4\| | 0.19 |
| (R3 + R4)/(R3 − R4) | −0.06 | \|f/f5\| + \|f/f6\| | 1.58 |
| \|R8/f\| + \|R10/f\| + \|R12/f\| | 11.33 | \|f6/f2\| | 0.56 |
| (CT4/T34) + (CT4/T45) | 3.46 | f/R8 | 0.28 |
| CT6/T45 | 0.72 | f/R10 | 0.13 |
| (T45/T23) + (T45/T34) | 6.46 | — | — |

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising, in order from an object side to an image side:
   a first lens element with positive refractive power having an object-side surface being convex in a paraxial region thereof;
   a second lens element having negative refractive power;
   a third lens element;
   a fourth lens element, wherein at least one of an object-side surface and an image-side surface of the fourth lens element has at least one inflection point;
   a fifth lens element having an object-side surface being convex in a paraxial region thereof, wherein an image-side surface of the fifth lens element has at least one inflection point, and the image-side surface of the fifth lens element is aspheric; and
   a sixth lens element having an image-side surface being concave in a paraxial region thereof, wherein the image-side surface of the sixth lens element has at least one convex shape in an off-axial region thereof, and the image-side surface of the sixth lens element is aspheric;
   wherein the optical imaging lens assembly has a total of six lens elements, there is an air gap in a paraxial region between every two lens elements of the optical imaging lens assembly that are adjacent to each other; a focal length of the optical imaging lens assembly is f, a central thickness of the fourth lens element is CT4, a curvature radius of the image-side surface of the fourth lens element is R8, a curvature radius of the image-side surface of the fifth lens element is R10, an axial distance between the second lens element and the third lens element is T23, an axial distance between the third lens element and the fourth lens element is T34, an axial distance between the fourth lens element and the fifth lens element is T45, and the following conditions are satisfied:

$0 \le f/R8$;

$0 \le f/R10$;

$0 < (CT4/T34)+(CT4/T45) < 5.0$; and $0.95 < T45/T23$.

2. The optical imaging lens assembly of claim 1, wherein the image-side surface of the fourth lens element is concave in a paraxial region thereof, and the image-side surface of the fifth lens element is concave in a paraxial region thereof.

3. The optical imaging lens assembly of claim 2, wherein an object-side surface of the sixth lens element is convex in a paraxial region thereof.

4. The optical imaging lens assembly of claim 2, wherein the fifth lens element has positive refractive power, and the sixth lens element has negative refractive power.

5. The optical imaging lens assembly of claim 2, wherein the axial distance between the second lens element and the third lens element is T23, the axial distance between the third lens element and the fourth lens element is T34, the axial distance between the fourth lens element and the fifth lens element is T45, and the following condition is satisfied:

$1.80 < (T45/T23)+(T45/T34)$.

6. The optical imaging lens assembly of claim 1, wherein the focal length of the optical imaging lens assembly is f, a focal length of the fifth lens element is f5, a focal length of the sixth lens element is f6, and the following condition is satisfied:

$1.0 < |f/f5|+|f/f6| < 2.5$.

7. The optical imaging lens assembly of claim 1, wherein an axial distance between the object-side surface of the first lens element and an image surface is TL, a maximum image height of the optical imaging lens assembly is ImgH, and the following condition is satisfied:

$TL/ImgH < 1.60$.

8. The optical imaging lens assembly of claim 7, wherein the focal length of the optical imaging lens assembly is f, a focal length of the third lens element is f3, a focal length of the fourth lens element is f4, and the following condition is satisfied:

$|f/f3|+|f/f4| < 0.75$.

9. The optical imaging lens assembly of claim 1, wherein a focal length of the second lens element is f2, a focal length of the sixth lens element is f6, and the following condition is satisfied:

$|f6/f2| < 1.0$.

10. The optical imaging lens assembly of claim 1, wherein the axial distance between the second lens element and the third lens element is T23, the axial distance between the fourth lens element and the fifth lens element is T45, and the following condition is satisfied:

$1.04 \le T45/T23$.

11. The optical imaging lens assembly of claim 1, wherein the third lens element has positive refractive power, a central thickness of the sixth lens element is CT6, the axial distance between the fourth lens element and the fifth lens element is T45, and the following condition is satisfied:

$CT6/T45 < 1.70$.

12. The optical imaging lens assembly of claim 1, wherein the central thickness of the fourth lens element is CT4, the axial distance between the third lens element and the fourth lens element is T34, the axial distance between the fourth lens element and the fifth lens element is T45, and the following condition is satisfied:

$0.75 < (CT4/T34)+(CT4/T45) < 4.30$.

13. The optical imaging lens assembly of claim 1, wherein the focal length of the optical imaging lens assembly is f, the curvature radius of the image-side surface of the fourth lens element is R8, the curvature radius of the image-side surface of the fifth lens element is R10, a curvature radius of the image-side surface of the sixth lens element is R12, and the following condition is satisfied:

$1.5 < |R8/f|+|R10/f|+|R12/f| < 5.0$.

14. An image capturing unit, comprising:
    the optical imaging lens assembly of claim 1; and
    an image sensor, wherein the image sensor is disposed on an image surface of the optical imaging lens assembly.

15. An electronic device, comprising:
    the image capturing unit of claim 14.

16. An optical imaging lens assembly comprising, in order from an object side to an image side:
- a first lens element with positive refractive power having an object-side surface being convex in a paraxial region thereof;
- a second lens element with negative refractive power having an image-side surface being concave in a paraxial region thereof;
- a third lens element;
- a fourth lens element, wherein at least one of an object-side surface and an image-side surface of the fourth lens element has at least one inflection point;
- a fifth lens element, wherein an image-side surface of the fifth lens element has at least one inflection point, and the image-side surface of the fifth lens element is aspheric; and
- a sixth lens element with negative refractive power having an image-side surface being concave in a paraxial region thereof, wherein the image-side surface of the sixth lens element has at least one convex shape in an off-axial region thereof, and the image-side surface of the sixth lens element is aspheric;

wherein the optical imaging lens assembly has a total of six lens elements, there is an air gap in a paraxial region between every two lens elements of the optical imaging lens assembly that are adjacent to each other; a focal length of the optical imaging lens assembly is f, a central thickness of the fourth lens element is CT4, a curvature radius of an object-side surface of the second lens element is R3, a curvature radius of the image-side surface of the second lens element is R4, a curvature radius of the image-side surface of the fourth lens element is R8, a curvature radius of the image-side surface of the fifth lens element is R10, an axial distance between the second lens element and the third lens element is T23, an axial distance between the third lens element and the fourth lens element is T34, an axial distance between the fourth lens element and the fifth lens element is T45, and the following conditions are satisfied:

$0 \leq f/R8$;

$0 \leq f/R10$;

$0 < (CT4/T34)+(CT4/T45) < 5.0$;

$0.95 < T45/T23$; and $0 < (R3+R4)/(R3-R4)$.

17. The optical imaging lens assembly of claim 16, wherein the image-side surface of the fourth lens element is concave in a paraxial region thereof, and the image-side surface of the fifth lens element is concave in a paraxial region thereof.

18. The optical imaging lens assembly of claim 17, wherein an axial distance between the object-side surface of the first lens element and an image surface is TL, a maximum image height of the optical imaging lens assembly is ImgH, and the following condition is satisfied:

$TL/ImgH < 1.60$.

19. The optical imaging lens assembly of claim 17, wherein the axial distance between the second lens element and the third lens element is T23, the axial distance between the fourth lens element and the fifth lens element is T45, and the following condition is satisfied:

$1.04 \leq T45/T23$.

20. The optical imaging lens assembly of claim 17, wherein the object-side surface of the second lens element is convex.

21. The optical imaging lens assembly of claim 16, wherein the central thickness of the fourth lens element is CT4, the axial distance between the third lens element and the fourth lens element is T34, the axial distance between the fourth lens element and the fifth lens element is T45, and the following condition is satisfied:

$0.75 < (CT4/T34)+(CT4/T45) < 4.30$.

22. The optical imaging lens assembly of claim 16, wherein the fifth lens element has positive refractive power.

23. The optical imaging lens assembly of claim 16, wherein the focal length of the optical imaging lens assembly is f, the curvature radius of the image-side surface of the fourth lens element is R8, the curvature radius of the image-side surface of the fifth lens element is R10, a curvature radius of the image-side surface of the sixth lens element is R12, and the following condition is satisfied:

$1.5 < |R8/f| + |R10/f| + |R12/f| < 5.0$.

24. The optical imaging lens assembly of claim 16, wherein the focal length of the optical imaging lens assembly is f, a focal length of the fifth lens element is f5, a focal length of the sixth lens element is f6, and the following condition is satisfied:

$1.0 < |f/f5| + |f/f6| < 2.0$.

25. The optical imaging lens assembly of claim 16, wherein a focal length of the second lens element is f2, a focal length of the sixth lens element is f6, and the following condition is satisfied:

$|f6/f2| < 1.0$.

* * * * *